(12) United States Patent
Kyung et al.

(10) Patent No.: US 11,727,741 B2
(45) Date of Patent: *Aug. 15, 2023

(54) READER AND A METHOD FOR CONTROLLING THE READER

(71) Applicant: MOCA SYSTEM INC., Seongnam-si (KR)

(72) Inventors: Jae Hyun Kyung, Seongnam-si (KR); Jong Keun Lee, Seongnam-si (KR)

(73) Assignee: MOCA SYSTEM INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,734

(22) Filed: May 16, 2022

(65) Prior Publication Data

US 2022/0277606 A1   Sep. 1, 2022

Related U.S. Application Data

(63) Continuation of application No. 17/148,387, filed on Jan. 13, 2021, now Pat. No. 11,335,151.

(30) Foreign Application Priority Data

Jul. 31, 2020  (KR) .......................... 10-2020-0096408

(51) Int. Cl.
*G07C 9/29* (2020.01)
*H04W 4/80* (2018.01)
*H04L 67/51* (2022.01)

(52) U.S. Cl.
CPC ................ *G07C 9/29* (2020.01); *H04L 67/51* (2022.05); *H04W 4/80* (2018.02)

(58) Field of Classification Search
CPC ............. G07C 9/29; H04W 4/80; H04L 67/51
See application file for complete search history.

(56) References Cited

U.S. PATENT DOCUMENTS 5,909,183 A   6/1999  Borgstahl
8,768,838 B1  7/2014  Hoffman
(Continued)

FOREIGN PATENT DOCUMENTS

EP        3965262 A1 *  3/2022
IN    201741027075 A  *  2/2019
(Continued)

OTHER PUBLICATIONS

International Search Report in Application No. PCT/KR2020/010991 dated Apr. 19, 2021.
(Continued)

*Primary Examiner* — Chico A Foxx
(74) *Attorney, Agent, or Firm* — Maschoff Brennan

(57) ABSTRACT

A method for controlling a reader communicating with a user terminal using Bluetooth Low Energy (BLE), comprising: transmitting a first advertising packet to the user terminal; performing a first authentication with the user terminal that has received the first advertising packet; discovering service of the user terminal by the reader that has transmitted the first advertising packet after the first authentication is performed; obtaining a first service data from the user terminal in response to the discovering service; discovering characteristic of the user terminal based on the first service data; and obtaining a first characteristic data from the user terminal in response to the discovering characteristic.

15 Claims, 15 Drawing Sheets

(56) References Cited

U.S. PATENT DOCUMENTS

| | | |
|---|---|---|
| 9,057,210 B2 | 6/2015 | Dumas |
| 9,087,246 B1 | 7/2015 | Chin |
| 9,613,353 B1 | 4/2017 | Quigley |
| 9,613,478 B2 | 4/2017 | Dumas |
| 9,654,180 B2 | 5/2017 | Swaminathan |
| 9,682,638 B1 | 6/2017 | McCurdy |
| 2002/0052966 A1 | 5/2002 | Isomura |
| 2005/0245272 A1 | 11/2005 | Spaur |
| 2006/0052055 A1 | 3/2006 | Rowse |
| 2007/0046424 A1 | 3/2007 | Davis |
| 2008/0014984 A1 | 1/2008 | Brown |
| 2009/0047991 A1* | 2/2009 | Elg .................. H02J 7/342 455/552.1 |
| 2011/0117839 A1 | 5/2011 | Rhelimi |
| 2011/0208965 A1 | 8/2011 | Machani |
| 2011/0300802 A1 | 12/2011 | Proctor, Jr. |
| 2011/0314531 A1 | 12/2011 | Kim |
| 2012/0169461 A1 | 7/2012 | Dubois, Jr. |
| 2012/0280783 A1 | 11/2012 | Gerhardt |
| 2013/0176107 A1 | 7/2013 | Dumas |
| 2014/0145823 A1 | 5/2014 | Aase |
| 2014/0227972 A1 | 8/2014 | Swaminathan |
| 2014/0320261 A1 | 10/2014 | Davis |
| 2014/0378058 A1* | 12/2014 | Decuir .................. H04W 4/80 455/41.2 |
| 2015/0120362 A1 | 4/2015 | Whorley, Jr. |
| 2015/0289295 A1 | 10/2015 | Granbery |
| 2016/0150352 A1 | 5/2016 | Saed |
| 2016/0294562 A1 | 10/2016 | Oberheide |
| 2017/0001598 A1 | 1/2017 | Pophale |
| 2017/0086098 A1* | 3/2017 | Kwon .................. H04L 47/27 |
| 2017/0228953 A1 | 8/2017 | Lupovici |
| 2017/0244576 A1* | 8/2017 | Batra .............. H04W 56/0025 |
| 2017/0272166 A1* | 9/2017 | Albrecht ............ H04B 10/516 |
| 2017/0279808 A1* | 9/2017 | Kwon .................. H04W 76/10 |
| 2017/0280277 A1 | 9/2017 | Ge |
| 2017/0311161 A1 | 10/2017 | Kuenzi |
| 2017/0345236 A1 | 11/2017 | Kuenzi |
| 2017/0345237 A1 | 11/2017 | Kuenzi |
| 2017/0359162 A1* | 12/2017 | Granqvist .............. H04W 4/80 |
| 2018/0103030 A1 | 4/2018 | Einberg |
| 2018/0152593 A1 | 5/2018 | Sako |
| 2018/0160301 A1* | 6/2018 | Kwon .................. H04W 4/06 |
| 2018/0247472 A1* | 8/2018 | Odejerte, Jr. ......... G01S 5/0284 |
| 2018/0324156 A1* | 11/2018 | Mu ...................... H04W 4/80 |
| 2018/0332434 A1 | 11/2018 | Kulkarni |
| 2018/0373912 A1* | 12/2018 | Albrecht .............. G06F 3/0484 |
| 2018/0376527 A1 | 12/2018 | Hamada |
| 2019/0012705 A1* | 1/2019 | Todeschini ........ H04W 52/0254 |
| 2019/0035185 A1 | 1/2019 | Kuenzi |
| 2019/0045478 A1 | 2/2019 | Runyon |
| 2019/0090081 A1 | 3/2019 | Heydon et al. |
| 2019/0205119 A1 | 7/2019 | Naibero |
| 2019/0253255 A1 | 8/2019 | Mani |
| 2019/0266822 A1 | 8/2019 | Ruggieri |
| 2019/0288998 A1 | 9/2019 | Johansson |
| 2020/0029371 A1* | 1/2020 | Achtien ................ H04L 67/303 |
| 2020/0043271 A1 | 2/2020 | Anderson |
| 2020/0151986 A1 | 5/2020 | Kuenzi |
| 2020/0349785 A1 | 11/2020 | Kuenzi |
| 2020/0357212 A1 | 11/2020 | Frey |
| 2020/0382166 A1 | 12/2020 | Park |

FOREIGN PATENT DOCUMENTS

| | | | |
|---|---|---|---|
| KR | 10-2017-0040240 A | 4/2017 | |
| WO | WO-2005091997 A2 * | 10/2005 | ......... G06K 19/0723 |
| WO | WO-2016007186 A1 * | 1/2016 | ............. A61B 5/002 |
| WO | WO-2016008068 A1 * | 1/2016 | ............. G08C 17/02 |
| WO | 2018-135926 A1 | 7/2018 | |
| WO | 2019-129751 A1 | 7/2019 | |

OTHER PUBLICATIONS

Written Opinion in Application No. PCT/KR2020/010991 dated Apr. 19, 2021.

* cited by examiner

READER AND A METHOD FOR CONTROLLING THE READER

CROSS-REFERENCE TO RELATED APPLICATION

This application claims priority to and the benefit of Korean Patent Application No. 10-2020-0096408, filed on Jul. 31, 2020, the disclosure of which is incorporated herein by reference in its entirety.

BACKGROUND

1. Field of the Invention

The present disclosure relates to a reader and a method for controlling the reader.

2. Discussion of Related Art

As a technology for managing access to a building, a specific area, or the like, a technology for managing access by determining whether a door is open by acquiring information previously stored in a user terminal by an access management device is used.

Alternatively, as a technology for managing a security mode for a building or a specific area, a technology capable of changing activation or deactivation of the security mode through a user terminal is used.

In this technology, the user terminal has been conventionally implemented as a card key or the like, but recently, has been gradually expanded to a mobile terminal such as a smartphone or the like carried by a user.

In access management or security mode management using such a mobile terminal, since acquiring information, required for determining whether a door is open or whether the security mode is activated from the mobile terminal, through a previously installed device takes more time for a process from the connection of communication to determination after data acquisition compared to a conventional card key, there is discomfort in that the user feels a sensation of being delayed.

Further, in the case of conventional Bluetooth low energy (BLE) communication, depending on an operating system of the mobile terminal, there is a problem in that the time required for communication varies, access to a BLE stack is restricted, or data exchange takes more time than expected.

SUMMARY OF THE INVENTION

The present disclosure is directed to providing a reader capable of preventing the time required for communication from being affected by an operating system of a user terminal, or reducing the time taken to discover services or characteristics, by devices playing roles different from conventional roles in a generic access profile (GAP) and generic attribute profile (GATT), and a method of controlling the reader.

According to an embodiment, a method for controlling a reader communicating with a user terminal using Bluetooth Low Energy (BLE), comprises transmitting a first advertising packet to the user terminal; performing a first authentication with the user terminal that has received the first advertising packet; discovering service of the user terminal by the reader that has transmitted the first advertising packet after the first authentication is performed; obtaining a first service data from the user terminal in response to the discovering service; discovering characteristic of the user terminal based on the first service data; and obtaining a first characteristic data from the user terminal in response to the discovering characteristic.

According to another embodiment, a method for controlling a user terminal communicating with a reader using Bluetooth Low Energy (BLE), comprises obtaining a first advertising packet from the reader; performing a first authentication with the reader that has transmitted the first advertising packet; obtaining, by the user terminal that has obtained the first advertising packet, discovering service from the reader after the first authentication is performed; transmitting a first service data to the reader in response to the discovering service; obtaining discovering characteristic from the reader based on the first service data; and transmitting a first characteristic data to the reader in response to the discovering characteristic.

According to still another embodiment, a reader for communicating with a user terminal using Bluetooth Low Energy (BLE), comprises a communication unit; and a processor, wherein the processor configured to: transmit a first advertising packet to the user terminal; perform a first authentication with the user terminal that has received the first advertising packet; discover a service of the user terminal by the reader that has transmitted the first advertising packet after the first authentication is performed; obtain a first service data from the user terminal in response to the discovering service; discover characteristic of the user terminal based on the first service data; and obtain a first characteristic data from the user terminal in response to the discovering characteristic.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENT

Figure 1:
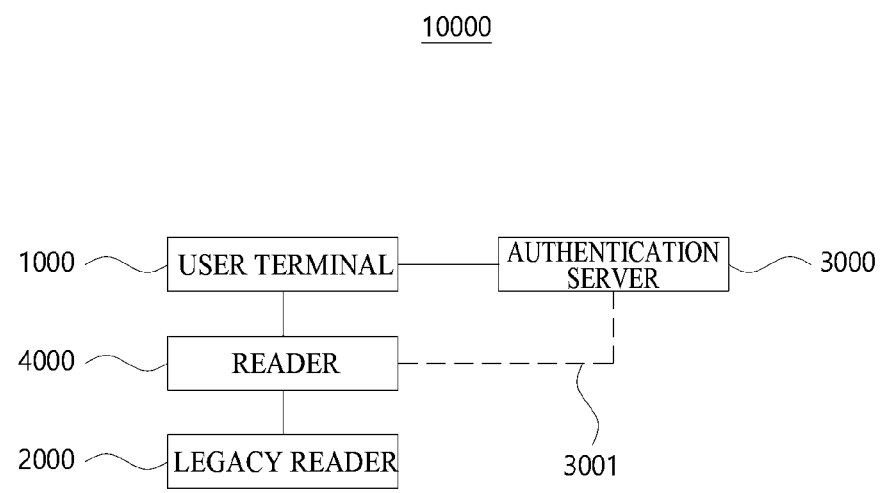
FIG. 1 is an environment view of an access management system according to one embodiment.

The aforementioned purpose, characteristics, and advantages of the present invention will now be described more fully with reference to the accompanying drawings. The present invention may, however, be embodied in many different forms and in what follows, particular embodiments of the present invention are illustrated in the accompanying drawings and described in detail.

In the drawings, the thicknesses of layers and regions are exaggerated for clarity. It will also be understood that when an element or a layer is referred to as being "on" another element or layer, it can be directly on another element or layer, or intervening layers may also be present. Basically, like reference numerals across the document represent like components. Further, like reference numerals will be used to designate like components having similar functions throughout the drawings within the scope of the present invention.

In addition, when it is determined that disclosure related to the present invention or a specific description about structure of the present invention may lead to misunderstanding of the purpose of the present invention, the corresponding specific description would be omitted. Also, numerals employed for the description of the present invention (e.g., a first, a second, etc.) are introduced only to distinguish one component from another component.

In addition, in the following description, words "module" and "unit" for describing elements are used only in consideration of facilitating description and do not have meanings or functions discriminated from each other.

According to an embodiment, a method for controlling a reader communicating with a user terminal using Bluetooth Low Energy (BLE), comprises transmitting a first advertising packet to the user terminal; performing a first authentication with the user terminal that has received the first advertising packet; discovering service of the user terminal by the reader that has transmitted the first advertising packet after the first authentication is performed; obtaining a first service data from the user terminal in response to the discovering service; discovering characteristic of the user terminal based on the first service data; and obtaining a first characteristic data from the user terminal in response to the discovering characteristic.

Here, the reader is connected to a legacy reader provided in a predetermined device and provides a first communication protocol including the BLE not supported by the legacy reader and the reader obtains data from the user terminal in the first communication protocol, and the method further comprises converting a format of data obtained from the user terminal into a format interpreted by the legacy reader; and transmitting the converted data to the legacy reader in a second communication protocol supported by the legacy reader.

Here, the reader is connected to a legacy reader provided in a predetermined device and the reader communicates with the user terminal in a first communication protocol including the BLE not supported by the legacy reader and communicates with the legacy reader or the predetermined device in a second communication protocol supported by the legacy reader and the reader obtains data from the user terminal in the first communication protocol, and the method further comprises performing an authentication of the user terminal for the legacy reader based on data obtained from the user terminal; and providing the data to the legacy reader in the second communication protocol based on a result of the authentication, when the user terminal has an authority to provide information to the legacy reader.

Here, the method further comprises obtaining a scan request packet from the user terminal after transmitting the first advertising packet; and transmitting a scan response packet to the user terminal in response to the scan request packet.

Here, the method further comprises storing a handle value of the user terminal.

Here, the method further comprises storing an Universally Unique Identifier (UUID) of the user terminal.

Here, the reader is a peripheral device in Generic Access Profile (GAP) and the user terminal is a central device in the GAP.

Here, the reader is a client device in Generic Attribute Profile (GATT) and the user terminal is a server device in the GATT.

Here, when a second communication between the reader and the user terminal is performed, after a first communication between the reader and the user terminal including the storing the handle value is terminated, the method further comprises transmitting a second advertising packet to the user terminal; performing a second authentication with the user terminal, which has received the second advertising packet; transmitting, by the reader that has transmitted the second advertising packet, an enable write command to the user terminal after the second authentication is performed and the reader does not discover service of the user terminal in the second communication.

Here, the method further comprises obtaining, by the reader that has transmitted the second advertising packet, a second characteristic data from the user terminal based on the stored handle value after the second authentication is performed and the reader does not discover characteristic of the user terminal in the second communication.

Here, the method further comprises obtaining information on a shared key and a first one-time password (OTP) generated at a first time from the user terminal; generating a second OTP at a second time based on the shared key and the first time and second time are included within a predetermined time interval; and comparing the first OTP and the second OTP.

Here, there is provided a non-transitory computer-readable recording medium having recorded thereon a program for performing the above-described method According to another embodiment, a method for controlling a user terminal communicating with a reader using Bluetooth Low Energy (BLE), comprises obtaining a first advertising packet from the reader; performing a first authentication with the reader that has transmitted the first advertising packet; obtaining, by the user terminal that has obtained the first advertising packet, discovering service from the reader after the first authentication is performed; transmitting a first service data to the reader in response to the discovering service; obtaining discovering characteristic from the reader based on the first service data; and transmitting a first characteristic data to the reader in response to the discovering characteristic.

Here, there is provided a non-transitory computer-readable recording medium having recorded thereon a program for performing the above-described method According to still another embodiment, a reader for communicating with a user terminal using Bluetooth Low Energy (BLE), comprises a communication unit; and a processor, wherein the processor configured to: transmit a first advertising packet to the user terminal; perform a first authentication with the user terminal that has received the first advertising packet; discover a service of the user terminal by the reader that has transmitted the first advertising packet after the first authentication is performed; obtain a first service data from the user terminal in response to the discovering service; discover characteristic of the user terminal based on the first service data; and obtain a first characteristic data from the user terminal in response to the discovering characteristic.

Here, there is provided a non-transitory computer-readable recording medium having recorded thereon a program for performing the above-described method Hereinafter, an access management method according to one embodiment of the present disclosure and an access management device using the same will be described.

FIG. 1 is an environment view of an access management system 10000 according to one embodiment.

Referring to FIG. 1, the access management system 10000 according to one embodiment may include a user terminal 1000, a legacy reader 2000, an authentication server 3000, and a reader 4000.

According to one embodiment, the user terminal 1000 may be connected to the reader 4000.

Further, the user terminal 1000 may transmit communication signals to the reader 4000.

In addition, the user terminal 1000 may transmit connection authentication information to the reader 4000 to be communicatively connected to the reader 4000.

In addition, the user terminal 1000 may transmit authentication information to the reader 4000 to request the opening of a door.

In addition, the user terminal 1000 may transmit the authentication information to the reader 4000 to determine validity, and may transmit open request information to request the opening of the door.

According to one embodiment, the reader 4000 may be connected to the user terminal 1000.

Further, the reader 4000 may receive signals from the user terminal 1000 to acquire received signal strength indication (RSSI) of the received signals.

In addition, the reader 4000 may acquire the authentication information from the user terminal 1000, and the validity may be determined based on the acquired authentication information. The reader 4000 may determine whether the door is open based on a validity determination result.

According to one embodiment, the authentication server 3000 may be connected to the user terminal 1000. Further, the authentication server 3000 may be connected to the legacy reader 2000 and the reader 4000.

According to one embodiment, the authentication server 3000 may be connected to both the user terminal 1000 and the reader 4000.

As shown by a dotted line 3001 in FIG. 1, the authentication server 3000 may be connected to the reader 4000 to communicate with the reader 4000 through a communication unit of the reader 4000.

For example, the authentication server 3000 may be physically connected to the reader 4000 or may be connected through wireless communication to share data. Specifically, the authentication server 3000 and the reader 4000 may be connected using a Wi-Fi communication or Bluetooth low energy (BLE) protocol communication method.

The authentication server 3000 may provide the authentication information transmitted by the user terminal 1000 to the reader 4000 to request the opening of the door.

The authentication server 3000 may receive a request for issue of the authentication information from the user terminal 1000.

Further, the authentication server 3000 may acquire information necessary to determine a valid user and/or user terminal 1000 while receiving a request for issue of the authentication information from the user terminal 1000, and as a result of the determination, in the case of the valid user and/or user terminal, the authentication information may be issued to the user terminal 1000.

In addition, as shown by the dotted line 3001 in FIG. 1, the authentication server 3000 may be connected to the reader 4000 to provide the authentication information to the reader 4000.

In this case, the authentication server 3000 may frequently update the authentication information. For example, the authentication server 3000 may update the authentication information periodically or whenever an event (a request, a content change, or the like) occurs.

The authentication server 3000 may perform authentication on the user terminal 1000. For example, the authentication server 3000 may determine whether the user terminal 1000 has the authority to provide information to the legacy reader 2000 based on the authentication result for the user terminal 1000.

Alternatively, the authentication server 3000 may transmit or share information necessary for the authentication of the user terminal 1000 to or with the reader 4000. For example, the reader 4000 may perform authentication on the user terminal 1000 based on the information necessary for the authentication received from the authentication server 3000. Based on the authentication result, whether the user terminal 1000 has the authority to provide the information to the legacy reader 2000 may be determined.

The legacy reader 2000 may be connected to the reader 4000.

For example, the legacy reader 2000 may be a reader capable of communicating with a previously installed predetermined device.

For example, the legacy reader 2000 may communicate with a door opening/closing device to transmit whether the door is opened or closed to the door opening/closing device.

Further, for example, the legacy reader 2000 may communicate with the previously installed predetermined device to transmit whether a guard mode is activated to the predetermined device.

According to some embodiments of the present disclosure, connection between the user terminal 1000 and the legacy reader 2000 may be implemented through connection between the legacy reader 2000 and the reader 4000.

The reader 4000 may be a component which adds a communication method other than a communication method supported by the previously installed legacy reader 2000.

According to some embodiments of the present disclosure, the reader 4000 may be connected to the legacy reader 2000.

The reader 4000 may be connected to the legacy reader 2000 to transmit and/or receive data.

The legacy reader 2000 of the present disclosure may be a reader provided in the previously installed predetermined device. For example, the legacy reader 2000 may be an operation mode activation device or a door reader.

For example, the legacy reader 2000 may serve to set/release the guard mode when performing a function of the operation mode activation device.

Further, for example, when the legacy reader 2000 performs a function of the door reader, a command or data may be transmitted to the door opening/closing device so that the door opening/closing device performs a door opening/locking function.

Figure 2:
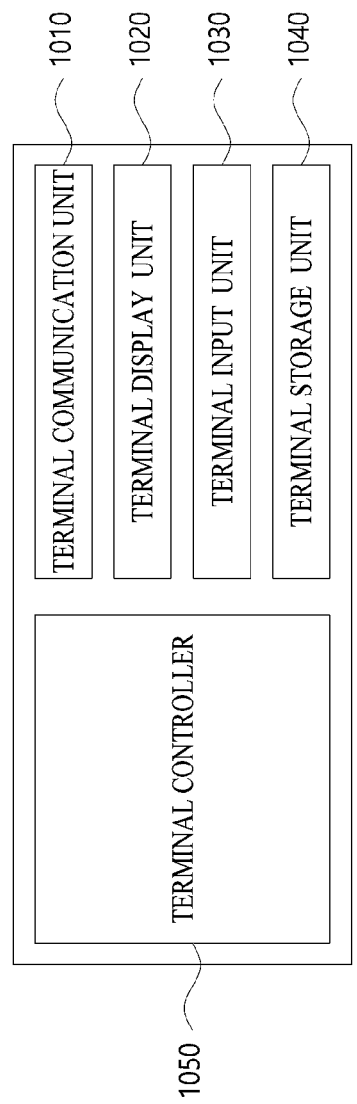
FIG. 2 is a block diagram illustrating a user terminal according to one embodiment.

FIG. 2 is a block diagram illustrating the user terminal according to one embodiment.

Referring to FIG. 2, the user terminal 1000 may include a terminal communication unit 1010, a terminal display unit 1020, a terminal input unit 1030, a terminal storage unit 1040, and a terminal controller 1050.

The terminal communication unit 1010 may connect the user terminal 1000 to an external electronic device. For example, the terminal communication unit 1010 may connect the user terminal 1000 to external electronic devices such as the legacy reader 2000, the authentication server 3000, and the like. Further, the terminal communication unit 1010 may be a communication module which supports wired and/or wireless communication.

The terminal display unit 1020 may output visual information.

When the terminal display unit 1020 is provided as a touch screen, the terminal display unit 1020 may perform a function of the terminal input unit 1030. In this case, selectively, a separate terminal input unit 1030 may not be provided, and the terminal input unit 1030 which performs limited functions such as volume control, a power button, a home button, and the like may be provided.

The terminal input unit 1030 may acquire signals corresponding to a user's input.

The terminal input unit 1030 may be implemented as, for example, a keyboard, a keypad, a button, a jog shuttle, a wheel, and the like.

Further, the user's input may be, for example, pressing of a button, touching, dragging, and the like.

When the terminal display unit 1020 is implemented as a touch screen, the terminal display unit 1020 may serve as the terminal input unit 1030.

The terminal storage unit 1040 may store data.

The terminal storage unit 1040 may be implemented as, for example, a flash memory, a random access memory (RAM), a read only memory (ROM), a solid state drive (SSD), a secure digital (SD) card, an optical disk, and the like.

The terminal storage unit 1040 may store data necessary for the operation of the user terminal 1000.

The terminal controller 1050 may oversee the operation of the user terminal 1000.

Figure 3:
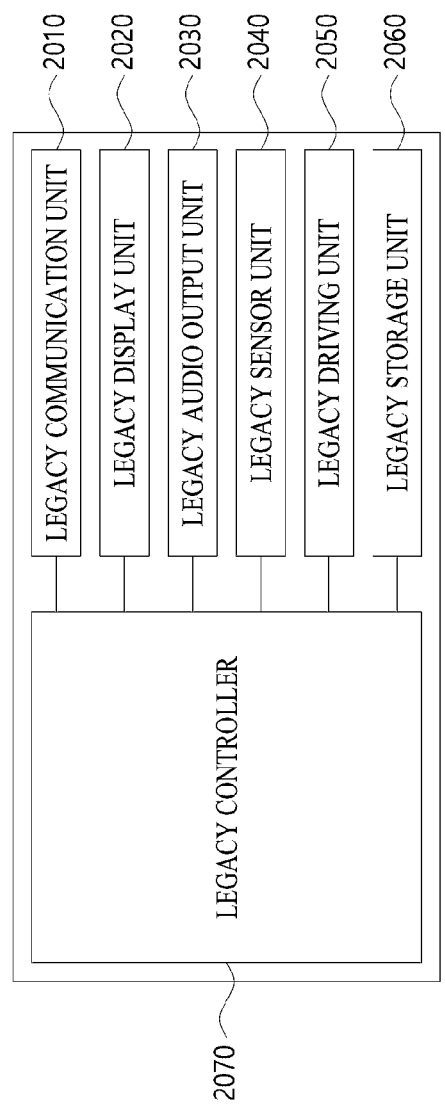
FIG. 3 is a block diagram illustrating a legacy reader according to one embodiment.

FIG. 3 is a block diagram illustrating the legacy reader according to one embodiment.

Referring to FIG. 3, the legacy reader 2000 may include a legacy communication unit 2010, a legacy display unit 2020, a legacy audio output unit 2030, a legacy sensor unit 2040, a legacy driving unit 2050, a legacy storage unit 2060, and a legacy controller 2070.

The legacy communication unit 2010 may be a communication module capable of acquiring data from the user terminal 1000.

The legacy communication unit 2010 according to some embodiments of the present disclosure may acquire the data from the user terminal 1000 through communication methods such as Bluetooth, Zigbee, Bluetooth low energy (BLE), radio frequency identification (RFID), and the like According to one embodiment, the legacy communication unit 2010 may acquire the corrected received signal strength indication (RSSI) from the user terminal 1000 through a low-pass filter or a Schmitt trigger.

Further, according to one embodiment, the legacy communication unit 2010 may correct the RSSI acquired from the user terminal 1000 through the low-pass filter or the Schmitt trigger after acquiring the RSSI from the user terminal 1000.

The legacy display unit 2020 may output visual information.

The legacy display unit 2020 may output information to be visually provided to a user. When the legacy display unit 2020 includes a touch panel, the legacy display unit 2020 may operate as an input device based on touch input.

The legacy audio output unit 2030 may output information to be audibly provided to the user.

For example, the legacy audio output unit 2030 may be a speaker, a buzzer, and the like which output sound.

The legacy sensor unit 2040 may acquire signals for an open state of the door. Alternatively, the legacy sensor unit 2040 may acquire signals necessary for determining a state of the door.

The legacy sensor unit 2040 may acquire signals for an external environment necessary for the legacy reader 2000. For example, the legacy sensor unit 2040 may acquire signals for a distance between the user and an object. For another example, the legacy sensor unit 2040 may acquire signals necessary for determining a position of a door leaf.

The legacy driving unit 2050 may provide power necessary for locking or unlocking the door leaf provided in the door. Further, when the door is implemented as an automatic door, the legacy driving unit 2050 may provide power necessary for opening or closing the door leaf.

The legacy storage unit 2060 may store a program which performs a control operation of the legacy controller 2070, and may store data received from the outside, data generated by the legacy controller 2070, and the like.

The legacy controller 2070 controls the overall operation of the legacy reader 2000.

Figure 4:
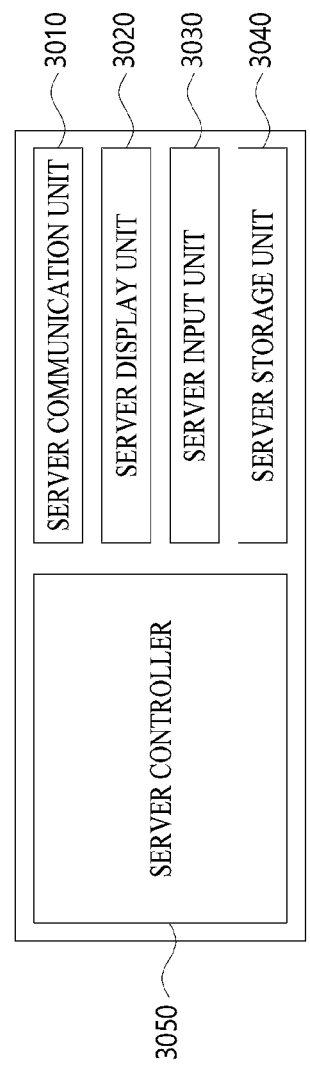
FIG. 4 is a block diagram illustrating an authentication server according to one embodiment.

FIG. 4 is a block diagram illustrating an authentication server according to one embodiment.

Referring to FIG. 4, the authentication server 3000 may include a server communication unit 3010, a server display unit 3020, a server input unit 3030, a server storage unit 3040, and a server controller 3050.

The server communication unit 3010 may connect the authentication server 3000 and an external electronic device. That is, the server communication unit 3010 may transmit/receive data to/from the external electronic device. Further, the server communication unit 3010 may maintain or release the communication connection with the user terminal 1000 as necessary. In addition, the server communication unit 3010 may be provided to maintain connection with the user terminal 1000 at all times according to the embodiment.

In addition, the server communication unit 3010 may be a communication module which supports at least one of a wired communication method and a wireless communication method.

The server display unit 3020 may output visual information.

For example, the server display unit 3020 may be a liquid crystal display (LCD), an organic light-emitting diode (OLED) display, an active matrix organic light-emitting diode (AMOLED) display, or the like.

The server input unit 3030 may acquire electrical signals corresponding to user input. For example, the server input unit 3030 may include a keypad, a keyboard, a switch, a button, a touch screen, and the like.

The server storage unit 3040 may store data.

For example, the server storage unit 3040 may store data acquired from the user terminal 1000. As another example, the server storage unit 3040 may store a program necessary for the operation of the authentication server 3000.

The server controller 3050 may oversee the operation of the authentication server 3000.

The authentication server 3000 of the present disclosure does not necessarily include all the above-described components, and may be selectively provided in a form without some of the components. For example, when the authentication server 3000 does not directly provide visual information, the authentication server 3000 may be provided in a form without the server display unit 3020. Further, the authentication server 3000 may be provided in a form in which a component for performing additional functions and operations is added according to the selection.

Figure 5:
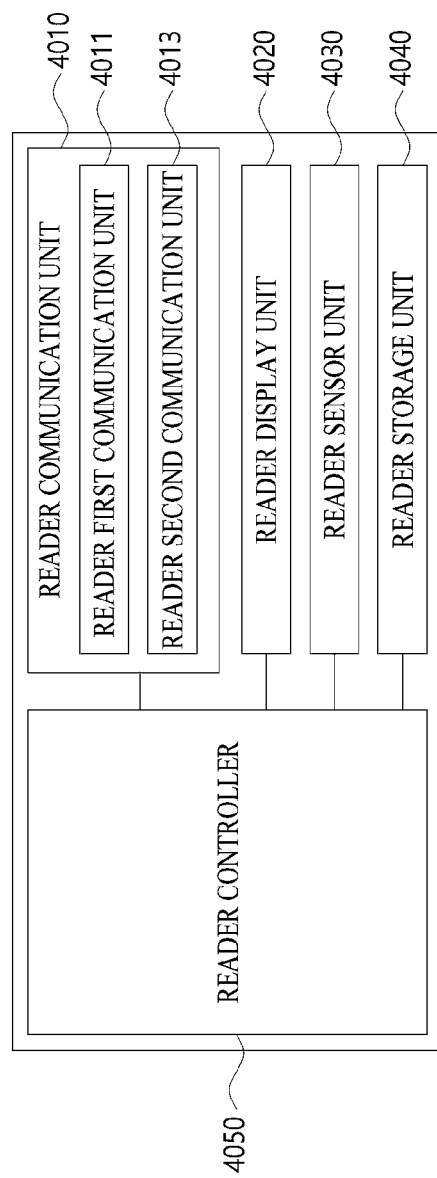
FIG. 5 is a block diagram illustrating a reader according to one embodiment.

FIG. 5 is a block diagram illustrating a reader according to one embodiment.

Referring to FIG. 5, the reader 4000 may include a reader communication unit 4010, a reader display unit 4020, a reader sensor unit 4030, a reader storage unit 4040, and a reader controller 4050.

The reader communication unit 4010 may include a reader first communication unit 4011 and a reader second communication unit 4013.

The reader communication unit 4010 may be connected to the user terminal 1000 and the legacy reader 2000.

For example, the reader communication unit 4010 may be connected to the terminal communication unit 1010 of the user terminal 1000 when connected to the user terminal 1000.

Further, the reader communication unit 4010 may provide at least one communication method that is not supported by the legacy reader 2000.

The reader communication unit 4010 may include the reader first communication unit 4011 connected to the user terminal 1000 and the reader second communication unit 4013 connected to the legacy reader 2000.

According to one embodiment, the reader first communication unit 4011 may acquire data from the user terminal 1000, and the reader second communication unit 4013 may provide data to the legacy reader 2000.

Further, according to one embodiment, a communication method by which the reader first communication unit 4011 is connected to the user terminal 1000 and a communication method by which the reader second communication unit 4013 is connected to the legacy reader 2000 may be different from each other.

For example, the reader first communication unit 4011 may be connected to the user terminal 1000 through a Bluetooth communication method, and the reader second communication unit 4013 may be connected to the legacy reader 2000 through a magnetic communication method.

Further, according to one embodiment, the reader first communication unit 4011 may support at least one communication method different from a communication method supported by the reader second communication unit 4013.

For example, the reader first communication unit 4011 may be connected to the user terminal 1000 through the Bluetooth communication method to acquire data, and the reader second communication unit 4013 may use the magnetic communication method to provide data to the legacy reader 2000.

The reader display unit 4020 may output visual information.

The reader display unit 4020 may output information to be visually provided to the user. When the reader display unit 4020 includes a touch panel, the reader display unit 4020 may operate as an input device based on touch input.

The reader sensor unit 4030 may acquire open request information from the outside.

According to one embodiment, the reader sensor unit 4030 may be provided as at least one of an image sensor, a bio-signal acquisition sensor, and a barcode reader.

The image sensor may be a sensor module which acquires signals corresponding to an external image.

The bio-signal acquisition sensor may be a sensor module which acquires signals for biometric information such as fingerprints, veins, irises, faces, and the like.

The barcode reader may be a sensor module which acquires information from code data such as a one-dimensional barcode, a two-dimensional barcode, and the like.

The one-dimensional barcode may be a linear barcode. Further, the two-dimensional barcode may be a two-dimensional-type barcode such as a QR code, Aztec, MaxiCode, Data Matrix, and the like.

The reader storage unit 4040 may store a program which performs a control operation of the reader controller 4050, and may store data received from the outside, data generated from the reader controller 4050, and the like.

The reader controller 4050 may control the operations of some components included in the reader 4000. Further, the reader controller 4050 may acquire signals from some components included in the reader 4000.

In addition, the reader controller 4500 may control an operation for performing some steps performed by the reader 4000 among steps described in the methods which will described later, or may perform an arithmetic operation necessary for performing the step.

Hereinafter, a wireless communication method using a Bluetooth low energy (BLE) protocol communication method of the present disclosure will be described.

Figure 6:
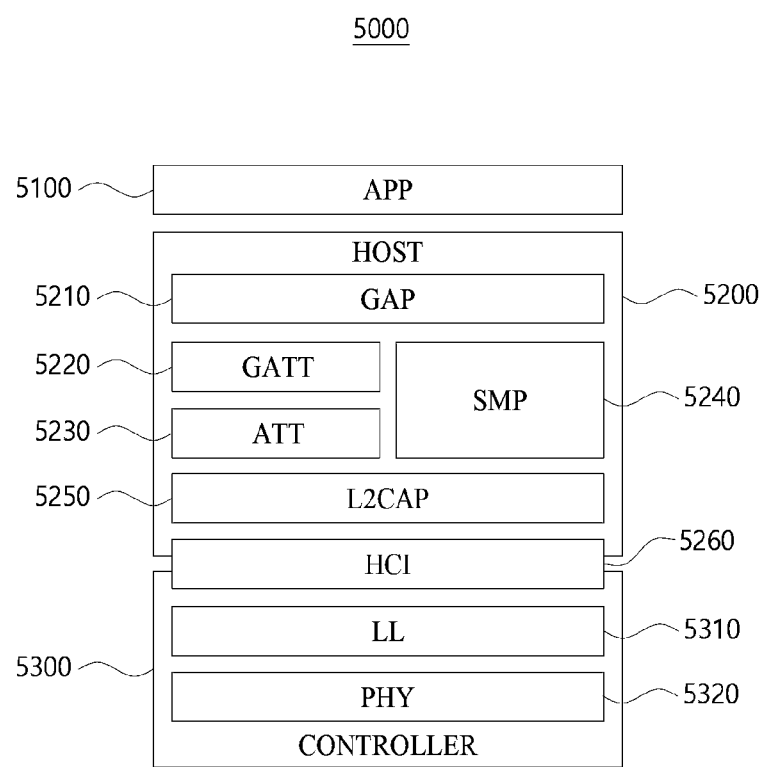
FIG. 6 is a view illustrating a Bluetooth low energy (BLE) protocol stack according to one embodiment.

FIG. 6 is a view illustrating a Bluetooth low energy (BLE) protocol stack according to one embodiment.

Referring to FIG. 6, a BLE protocol stack 5000 according to one embodiment may include an apps area (APPS) 5100, a host area (HOST) 5200, and a controller area (CONTROLLER) 5300.

The apps area 5100 may provide an application.

The host area 5200 may include a generic access profile (GAP) 5210, a generic attribute (GATT) 5220, an attribute protocol (ATT) 5230, a security manager protocol (SMP) 5240, and a logical link control and adaptation protocol (L2CAP) 5250.

The GAP 5210 may define a procedure and a role related to discovery in an aspect of link management for sharing information with the Bluetooth device and connecting to the Bluetooth device, and may be used as an interface for implementing other Bluetooth modes in the apps area 5100.

In the GAP 5210, the device may serve as a central device or a peripheral device.

The central device may correspond to a master role of a link layer (LL) 5310. The central device may receive an advertising packet of the peripheral device. Further, the central device may transmit a connection request to the peripheral device.

The peripheral device may correspond to the role of a slave of the LL 5310. The peripheral device may transmit the advertising packet to the central device. The peripheral device may induce the central device to transmit a connection request packet.

The GATT 5220 may encapsulate an operation of a device using the attribute protocol ATT, and may perform a role for a general operation. Further, the GATT 5220 may perform functions such as service discovery, characteristic value identification, reading, writing, and the like.

The ATT 5230 may define a client protocol and a server protocol for data exchange.

The GATT 5220 may be a top-level implementation of the ATT 5230. In the GATT 5220, a device may serve as a client or a server.

The client device may request data from the server device. Further, the client device may perform service discovery of the server device.

When the server device receives the request from the client device, the server device may transmit a response to the request. Further, the server device may generate and store user data which is usable by the client device. In addition, the server device may transmit data to the client device.

For example, in response to the service discovery of the client device, the server device may transmit service data to the client device. Further, for example, in response to a discovery of characteristics of the client device, the server device may transmit characteristics data to the client device.

The SMP 5240 may provide a security algorithm and a security protocol to generate and exchange a security key necessary for encrypted security communication.

The L2CAP 5250 may provide a data service to a higher level, and may perform a role of segmenting a packet to be sent to a controller or reassembling a received packet.

For communication between the host area 5200 and the controller area 5300, a hardware controller interface (HCI) 5260 may be used.

The HCI 5260 may be used as a standard interface for communication between a controller and a host.

The controller area 5300 may include the link layer (LL) 5310 and a physical layer (PHY) 5320.

The LL 5310 may perform a role of defining a packet structure/channel, a connection procedure, and data transmission/reception.

The PHY 5320 may control the transmission and reception of 2.4 GHz radio waves through a Bluetooth communication channel.

Figure 7:
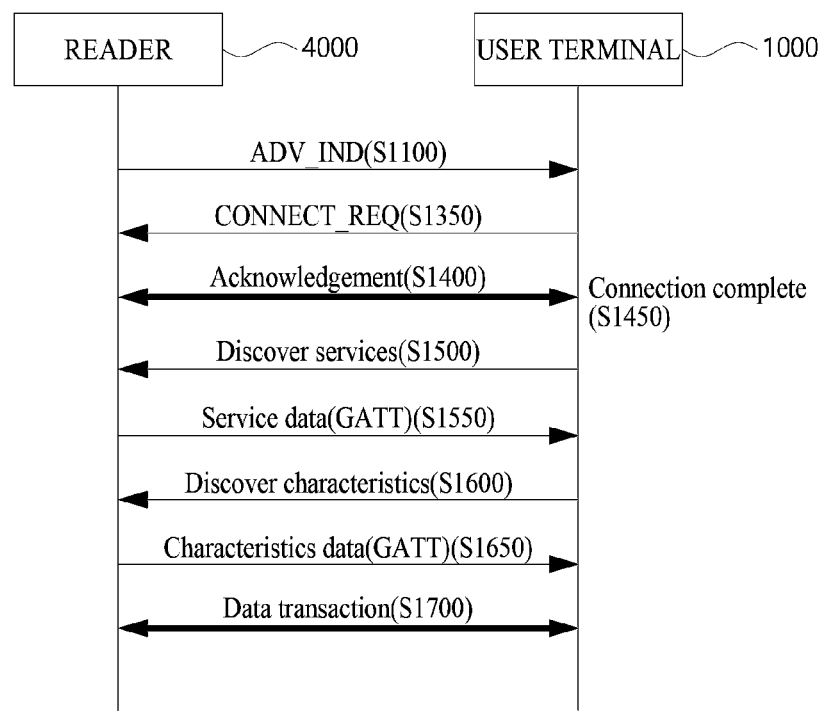
FIG. 7 is a view illustrating a conventional data exchange process according to a BLE communication method.

FIG. 7 is a view illustrating a conventional data exchange process according to a BLE communication method.

Referring to FIG. 7, FIG. 7 illustrates the conventional data exchange process between the user terminal 1000 and the reader 4000.

According to one embodiment, the reader 4000 may be a device capable of communicating with other devices through not only the BLE method but also methods other than the BLE method. For example, the reader 4000 may be a device capable of communicating with other devices even through a magnetic communication method.

For example, the reader 4000 may communicate with the user terminal 1000 through the Bluetooth communication method, and may communicate with other devices through the magnetic communication method.

Further, for example, the reader 4000 may communicate with the user terminal 1000 through the Bluetooth communication method, and may communicate with the legacy reader 2000 through other communication methods, but the present disclosure is not limited thereto.

The conventional data exchange process between the user terminal 1000 and the reader 4000 may include a step in which the reader 4000 transmits an advertising packet (S1100), a step in which the user terminal 1000 receives the advertising packet and transmits a connection request packet to the reader 4000 (S1350), a step in which the user terminal 1000 and the reader 4000 recognize or acknowledge each other (S1400), and a step in which the connection between the user terminal 1000 and the reader 4000 is completed (S1450).

Further, the conventional data exchange process between the user terminal 1000 and the reader 4000 may include a step in which the user terminal 1000 discovers services of the reader 4000 (S1500), a step in which the reader 4000 transmits service data to the user terminal 1000 (S1550), a step in which the user terminal 1000 discovers characteristics of the reader 4000 (S1600), a step in which the reader 4000 transmits the characteristics data to the user terminal 1000 (S1650), and a step in which data exchange between the user terminal 1000 and the reader 4000 is performed (S1700).

In this case, when a size of the advertising packet is larger than or equal to predetermined bytes, a step in which the user terminal 1000 transmits a scan request packet to the reader 4000, and a step in which the reader 4000 transmits a scan response packet in response to the scan request packet may be included between steps S1100 and S1350.

According to one embodiment, the reader 4000 may periodically or aperiodically transmit the advertising packet (S1100). In this case, before the reader 4000 transmits the advertising packet, the user terminal 1000 may periodically or aperiodically scan a Bluetooth communication frequency band. The reader 4000 may transmit the advertising packet to the user terminal 1000 in response to a scan operation of the user terminal 1000, and the user terminal 1000 may receive the advertising packet transmitted by the reader 4000.

According to one embodiment, the user terminal 1000 may receive the advertising packet and transmit a connection request packet to the reader 4000 (S1350). In this case, when the reader 4000 receives the connection request packet from the user terminal 1000, acknowledgement of each other may be completed (S1400). When the user terminal 1000 and the reader 4000 complete the acknowledgement of each other, the connection with each other may be completed (S1450).

According to one embodiment, after the connection between the user terminal 1000 and the reader 4000 is completed, the user terminal 1000 may transmit a packet for service discovery to the reader 4000 (S1500). In this case, the reader 4000 may transmit service data to the user terminal 1000 in response to the packet (S1550).

According to one embodiment, the user terminal 1000 may transmit a packet for characteristic discovery to the reader 4000 after receiving the service data from the reader 4000 (S1550). In this case, the reader 4000 may transmit characteristics data to the user terminal 1000 in response to the packet (S1650). In this case, since the user terminal 1000 receives the characteristics data from the reader 4000, data exchange (S1700) may be performed between the user terminal 1000 and the reader 4000.

In order to exchange even data of only 1 byte between the user terminal 1000 and the reader 4000, the processes S1100 to S1700 should be performed.

The steps S1100 to S1350 may be performed on the GAP 5210. In this case, the user terminal 1000 may serve as a central device in the GAP 5210. Also, in this case, the reader 4000 may serve as a peripheral device in the GAP 5210.

For example, as a central device, the user terminal 1000 may periodically scan the advertising packet to be connected to another device, and may request connection to an appropriate device. After connection, the central device may serve to lead periodic data exchange.

Further, for example, the reader 4000 is a peripheral device and may periodically transmit the advertising packet to be connected to another device. When the device receiving the advertising packet transmits the connection request packet, the peripheral device may accept this and perform the connection.

The steps S1500 to S1650 may be performed on the GATT 5220. In this case, the user terminal 1000 may serve as a client in the GATT 5220. Also, in this case, the reader 4000 may serve as a server in the GATT 5220.

For example, the client device may request data from the server device after performing service discovery. Further, for example, when the server device receives the request from the client device, the server device may send a response signal to the request.

In the conventional BLE communication method between the reader and the user terminal, the reader 4000 serves as the peripheral device in the GAP 5210, and the reader 4000 serves as the server in the GATT 5220. Further, in the conventional BLE communication method, the user terminal 1000 serves as the central device in the GAP 5210, and the user terminal 1000 serves as the client in the GATT 5220.

However, according to the communication method of FIG. 7, in a process of connecting the user terminal 1000 and the reader 4000 and exchanging data, the time required for communication may vary in some cases.

For example, depending on the operating system (OS) of the user terminal 1000, the time required for communication may vary.

Further, for example, depending on the speed of an event handler provided by the operating system of the user terminal 1000, the time required for communication may vary.

In addition, for example, a surrounding device discovery speed may vary by the event handler provided by the operating system of the user terminal 1000.

In addition, for example, the time required for communication may vary depending on a data packet buffer allocated by the operating system of the user terminal 1000.

For example, in a case in which the operating system of the user terminal 1000 is an iPhone OS (iOS), the time required for communication may be longer than in a case in which the operating system of the user terminal 1000 is Android.

Specifically, when all data packet buffers are in use, data exchange may be started only by calling the event handler again at a later time.

Further, for example, since BLE communication is used based on an application programming interface (API), access to a BLE stack may be limited.

Accordingly, in the conventional BLE communication method between the user terminal 1000 and the reader 4000, when the roles of the user terminal 1000 and the reader 4000 are exchanged, and thus the reader 4000 becomes the central device in the GAP 5210, it is possible to solve the above problem in that the time required for communication varies depending on the operating system of the user terminal 1000.

Figure 8:
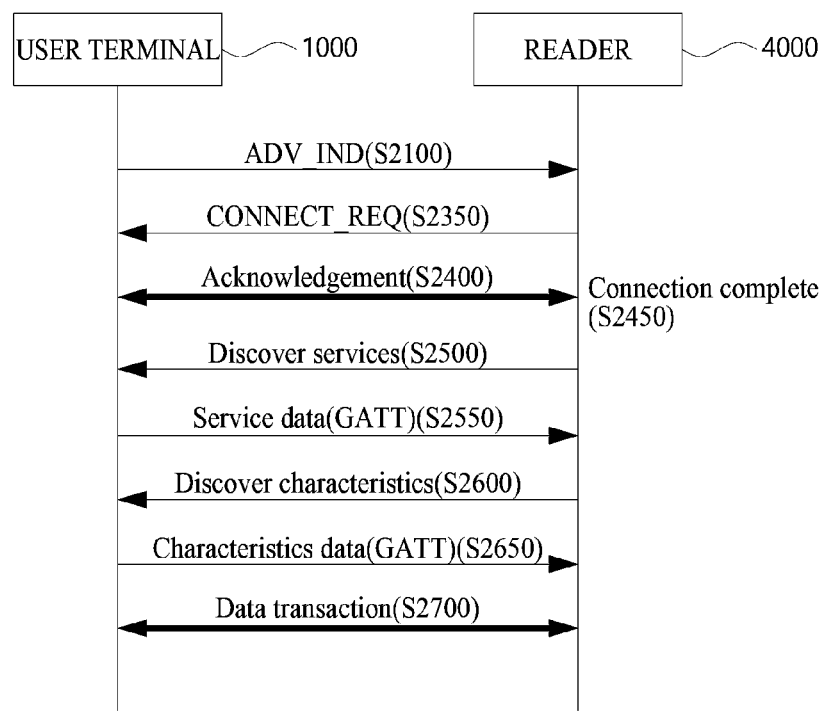
FIG. 8 is a view illustrating a communication method in which roles of the reader and the user terminal are changed in the conventional data exchange process.

FIG. 8 is a view illustrating a communication method in which roles of the reader and the user terminal are changed in the conventional data exchange process.

Referring to FIG. 8, FIG. 8 illustrates a communication method in which the roles of the user terminal 1000 and the reader 4000 are changed in the conventional data exchange process.

According to one embodiment, a data exchange process in which the roles of the user terminal 1000 and the reader 4000 are changed in comparison with the conventional data exchange process may include a step in which the user terminal 1000 transmits an advertising packet (S2100), a step in which the reader 4000 receives the advertising packet, and transmits a connection request packet to the user terminal 1000 (S2350), a step in which the user terminal 1000 and the reader 4000 recognize or acknowledge each other (S2400), and a step in which the connection between the user terminal 1000 and the reader 4000 is completed (S2450).

Further, the conventional data exchange process between the user terminal 1000 and the reader 4000 may include a step in which the reader 4000 discovers services of the user terminal 1000 (S2500), a step in which the user terminal 1000 transmits service data to the reader 4000 (S2550), a step in which the reader 4000 discovers characteristics of the user terminal 1000 (S2600), a step in which the user terminal 1000 transmits the characteristics data to the reader 4000 (S2650), and a step in which the data exchange between the user terminal 1000 and the reader 4000 is performed (S2700).

According to one embodiment, the user terminal 1000 may periodically or aperiodically transmit an advertising packet (S2100). In this case, before the user terminal 1000 transmits the advertising packet, the reader 4000 may periodically or aperiodically scan the Bluetooth communication frequency band. In this case, the reader 4000 may receive the advertising packet transmitted by the user terminal 1000.

According to one embodiment, the reader 4000 may receive the advertising packet and transmit a connection request packet to the user terminal 1000 (S2350). In this case, when the user terminal 1000 receives the connection request packet from the reader 4000, acknowledgement of each other may be completed (S2400). When the user terminal 1000 and the reader 4000 complete the acknowledgement of each other, the connection with each other may be completed (S2450).

According to one embodiment, after the connection between the user terminal 1000 and the reader 4000 is completed, the reader 4000 may transmit a packet for service discovery to the user terminal 1000 (S2500). In this case, the user terminal 1000 may transmit service data to the reader 4000 in response to the packet (S2550).

According to one embodiment, the reader 4000 may transmit a packet for characteristic discovery to the user terminal 1000 after receiving the service data from the user terminal 1000 (S2550). In this case, the user terminal 1000 may transmit characteristics data to the reader 4000 in response to the packet (S2650). In this case, since the reader 4000 receives the characteristics data from the user terminal 1000, data exchange may be performed between the user terminal 1000 and the reader 4000 (S2700).

The steps S2100 to S2350 may be performed on the GAP 5210. In this case, the reader 4000 may serve as a central device in the GAP 5210. Also, in this case, the user terminal 1000 may serve as a peripheral device in the GAP 5210.

For example, as a central device, the reader 4000 may periodically scan the advertising packet to be connected to another device and request connection to an appropriate device. After connection, the central device may serve to lead periodic data exchange.

Further, for example, the user terminal 1000 is a peripheral device and may periodically transmit the advertising packet to be connected to another device. When the device receiving the advertising packet transmits the connection request packet, the peripheral device may accept this and perform the connection.

The steps S2500 to S2650 may be performed on the GATT 5220. In this case, the reader 4000 may serve as a client in the GATT 5220. Also, in this case, the user terminal 1000 may serve as a server in the GATT 5220.

For example, the client device may request data from the server device after performing service discovery. Further, for example, when the server device receives the request from the client device, the server device may send a response signal to the request.

In the communication method in FIG. 8, since the reader 4000 becomes the central device, a conventional problem in that the time required for communication may vary depending on the operating system of the user terminal 1000 may be solved.

However, the communication method in FIG. 8 has the following problems.

First, when the reader 4000 becomes the central device and scans the advertising packet, there is an advantage in that a scanning speed is very fast, but there is a disadvantage in that power consumption of the reader 4000 may increase.

Accordingly, when the reader 4000 becomes the central device, a problem in that the advertising packet is difficult to be continuously scanned due to the power consumption during scanning may occur.

However, the communication method in FIG. 8 may have the following advantages.

First, when the reader 4000 serves as a GATT client, there may be an advantage in that a data exchange speed increases.

For example, when the reader 4000 serves as the GATT client to discover the services or characteristics of the user terminal 1000, since a discovery speed of the reader 4000 is greater than a discovery speed of the user terminal 1000, the data exchange speed may increase.

Further, when the reader 4000 serves as the GATT client, there may be an advantage in that the data may be immediately exchanged without a discovery process during secondary data exchange.

For example, when first data exchange of the reader 4000 is performed, a handle value of the user terminal 1000 received in the discovery process may be stored. For example, when the first data exchange of the reader 4000 is performed, channel information of the user terminal 1000 acquired in the discovery process may be stored.

Further, for example, the reader 4000 may store a universal unique identifier (UUID) of the user terminal 1000. In this case, the reader 4000 may be connected to and communicate with the user terminal at a greater speed than a speed at first connection when reconnected to the user terminal through the stored UUID of the user terminal 1000.

The reader 4000 may omit the discovery process during secondary data exchange using the handle value or the channel information. In this case, the reader 4000 may reduce the time required for the secondary data exchange by omitting the discovery process so that the time required for the secondary data exchange becomes smaller than the time required for the first data exchange.

The communication method in FIG. 8 may solve the conventional problem in FIG. 7 in that the time required for communication may vary depending on the operating system, but the above-described disadvantages may still exist.

That is, in the communication method in FIG. 8, while the reader 4000 serves as the client on the GATT 5220 and thus the data exchange speed increases, there may be a disadvantage in that the reader 4000 serves as the central device in the GAP 5210, and accordingly, power consumption increases.

Accordingly, the communication method of the present disclosure may provide the conventional communication method in FIG. 7 and the communication method in FIG. 8 in which the roles are changed, and furthermore, a hybrid method of the communication methods in FIGS. 7 and 8.

For example, a communication method in which the reader 4000 becomes the peripheral device in the GAP 5210 and serves as the GATT client in the GATT 5220 may be provided.

Hereinafter, a communication method of the present disclosure which the roles are partially changed will be described.

Figure 9:
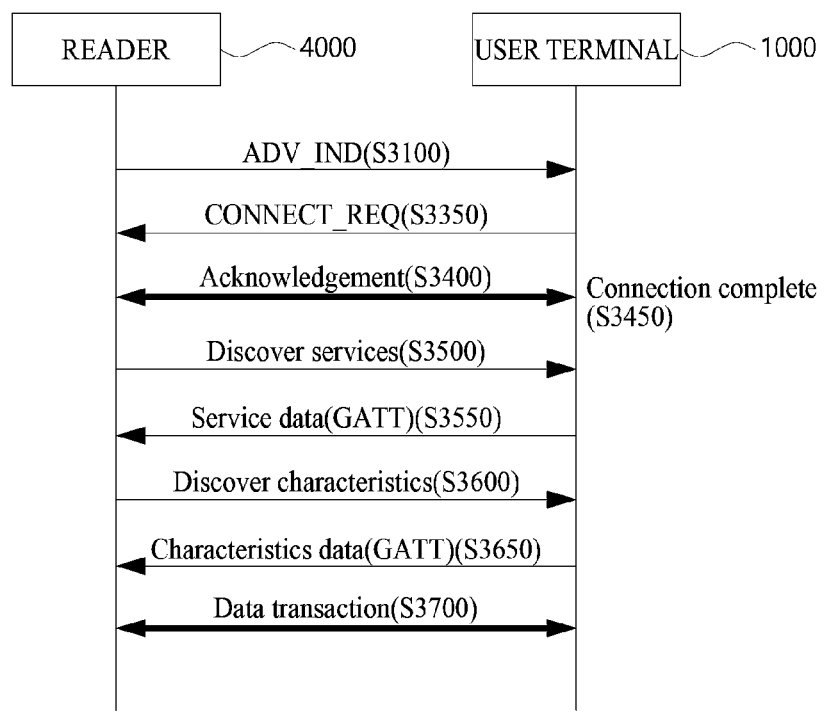
FIG. 9 is a view illustrating a data exchange process according to a BLE communication method according to one embodiment.

FIG. 9 is a view illustrating a data exchange process according to a BLE communication method according to one embodiment.

Referring to FIG. 9, FIG. 9 illustrates the data exchange process between the user terminal 1000 and the reader 4000.

According to one embodiment, the data exchange process between the user terminal 1000 and the reader 4000 may include a step in which the reader 4000 transmits an advertising packet (S3100), a step in which the user terminal 4000 receives the advertising packet and transmits a connection request packet to the reader 4000 (S3350), a step in which the user terminal 1000 and the reader 4000 recognize or acknowledge each other (S3400), and a step in which the connection between the user terminal 1000 and the reader 4000 is completed (S3450).

Further, the data exchange process between the user terminal 1000 and the reader 4000 according to one embodiment may include a step in which the reader 4000 discovers services of the user terminal 1000 (S3500), a step in which the user terminal 1000 transmits the service data to the reader 4000 (S3550), a step in which the reader 4000 discovers characteristics of the user terminal 1000 (S3600), a step in which the user terminal 1000 transmits the characteristics data to the reader 4000 (S3650), and a step in which the data exchange between the user terminal 1000 and the reader 4000 is performed (S3700).

Since basic descriptions of the steps S3100 to S3450 may overlap the descriptions in the steps S1100 to S1450 in FIG. 7, detailed descriptions thereof will be omitted.

Since basic descriptions of the steps S3500 to S3700 may overlap the descriptions in the steps S2500 to S2700 in FIG. 8, detailed descriptions thereof will be omitted.

When the reader 4000 transmits the advertising packet, that is, when the reader 4000 serves as the peripheral device in the GAP, a problem in that characteristics of the advertising packet may not be uniform depending on the operating system of the user terminal 1000 in FIG. 8 may be solved.

Accordingly, the reader 4000 may periodically transmit the advertising packet having uniform characteristics.

Further, when the reader 4000 discovers the services of the user terminal 1000, that is, when the reader 4000 serves as the client in GATT, the services may be discovered at a speed greater than a speed in the case in which the user terminal 1000 discovers the services of the reader 4000 in FIG. 7.

Accordingly, since the time required for the discovery process, which is required for the data exchange process, may be reduced, the overall time required for data exchange may be reduced.

Further, since the reader 4000 may store the handle value or channel information of the user terminal 1000 acquired in the discovery process, the time required for reconnection may be reduced by omitting the discovery process.

Accordingly, in the data exchange process according to the BLE communication method in FIG. 9, the reader 4000 may serve as the peripheral device in the GAP and as the client in the GATT. Further, the user terminal 1000 may serve as the central device in the GAP and as the server in the GATT.

That is, in comparison with the conventional communication method described in FIG. 7, the BLE communication method in FIG. 9 may be a method in which the roles of the user terminal 1000 and the reader 4000 are maintained in the GAP like the conventional method, and the user terminal 1000 and the reader 4000 communicate with each other with the changed roles in the GATT.

According to one embodiment, the data exchanged between the user terminal 1000 and the reader 4000 may include information on a one-time password (OTP). For example, a packet transmitted from the user terminal 1000 to the reader 4000 may include information on a first one-time password generated at a first time, a shared key, or a one-time password generation algorithm.

In this case, the reader 4000 may receive the data from the user terminal 1000 and confirm the information on the one-time password. For example, the reader 4000 may acquire the one-time password generation algorithm through the data.

For example, the user terminal 1000 and the reader 4000 have the same one-time password generation algorithm, and the reader 4000 may acquire a second one-time password at a second time through the algorithm.

In this case, the reader 4000 may compare the information on the first one-time password acquired from the data with the second one-time password generated through the algorithm to confirm information on a time when the received data is generated. The reader 4000 may confirm the real-time nature of the data by confirming the time when the received data is generated. Specifically, when the first one-time password and the second one-time password are the same, the reader 4000 may confirm that the data is the latest data.

In addition, the same one-time password generation algorithm of the user terminal 1000 and the reader 4000 may be respectively acquired from the authentication server 3000.

Alternatively, the user terminal 1000 may acquire the algorithm from the authentication server 3000 and transmit the algorithm to the reader 4000.

Alternatively, the reader 4000 may acquire the algorithm from the authentication server 3000 and transmit the algorithm to the user terminal 1000.

Alternatively, the reader 4000 may transmit a previously stored algorithm to the user terminal 1000.

Further, a period in which the user terminal 1000 and the reader 4000 acquire the one-time password generation algorithm may be periodic or aperiodic. Alternatively, the one-time password generation algorithm may be acquired when an event (request, or the like) occurs.

FIG. 9 illustrates only a wireless communication method between the user terminal 1000 and the reader 4000, but wireless communication between a reader 4000 and a reader 4000 is also possible.

According to one embodiment, the wireless communication method between readers may include a step in which a first reader transmits an advertising packet to a second reader, a step in which the second reader receives the advertising packet and transmits a connection request packet to the first reader, a step in which the first reader and the second reader acknowledge each other, and a step in which connection between the first reader and the second reader is completed.

Further, a data exchange process between the first reader and the second reader may include a step in which the first reader transmits an enable write command to the second reader through a previously stored handle value of the second reader, and a step in which the second reader receives the enable write command to record the enable, and a step in which data exchange between the first reader and the second reader is performed.

In this case, as the first reader uses the previously stored handle value of the second reader, it is possible to omit a step of discovering services or characteristics.

Further, as the first reader previously stores the handle value of the second reader, it is possible to omit a first authentication step between the user terminal 1000 and the reader 4000 shown in FIG. 9.

Figure 10:
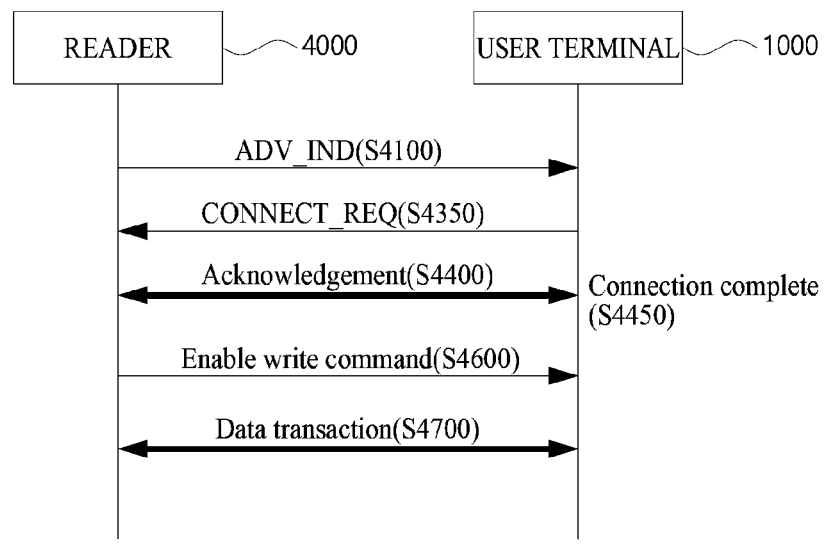
FIG. 10 is a view illustrating a data exchange process during a second communication connection after a first communication connection according to one embodiment.

FIG. 10 is a view illustrating a data exchange process during a second communication connection after a first communication connection according to one embodiment.

Referring to FIG. 10, FIG. 10 illustrates a second data exchange process between the user terminal 1000 and the reader 4000.

According to one embodiment, the second data exchange process between the user terminal 1000 and the reader 4000 may include a step in which the reader 4000 transmits an advertising packet (S4100), a step in which the user terminal 4000 receives the advertising packet and transmits a connection request packet to the reader 4000 (S4350), a step in which the user terminal 1000 and the reader 4000 recognize or acknowledge each other (S4400), and a step in which the connection between the user terminal 1000 and the reader 4000 is completed (S4450).

Further, the data exchange process between the user terminal 1000 and the reader 4000 according to one embodiment may include a step in which the reader 4000 transmits an enable write command to the user terminal 1000 (S4600) and a step in which the data exchange between the user terminal 1000 and the reader 4000 is performed (S4700).

Since basic descriptions of the steps S4100 to S4450 may overlap the descriptions in the steps S1100 to S1450 in FIG. 7, detailed descriptions thereof will be omitted.

Since basic descriptions of the step S4700 may overlap the descriptions in the step S2700 in FIG. 8, detailed descriptions thereof will be omitted.

In the conventional data exchange method in FIG. 7, in order to exchange even data of only 1 byte between the user terminal 1000 and the reader 4000, the processes S1100 to S1700 should be performed.

However, after the first data exchange process is performed, the required time may be reduced in the second data exchange process by omitting some processes.

FIG. 10 illustrates the second data exchange process after the first data exchange process in FIG. 9.

The data exchange process in FIG. 10 may reduce the time required for data exchange by omitting the service discovery process (S3500) and the characteristic discovery process (S3600) unlike that in FIG. 9.

Specifically, the data exchange process in FIG. 10 may be performed when the reader 4000 stores the handle value or the channel information of the user terminal 1000 during the first data exchange process.

For example, the data exchange process in FIG. 10, may reduce the time required for data exchange by omitting the discovery process using the handle value or channel information of the user terminal 1000 stored in the reader 4000.

In this case, the reader 4000 may omit the service or characteristic discovery process to reduce the time required for data exchange by transmitting the enable write command to the user terminal 1000 (S4600).

Figure 11:
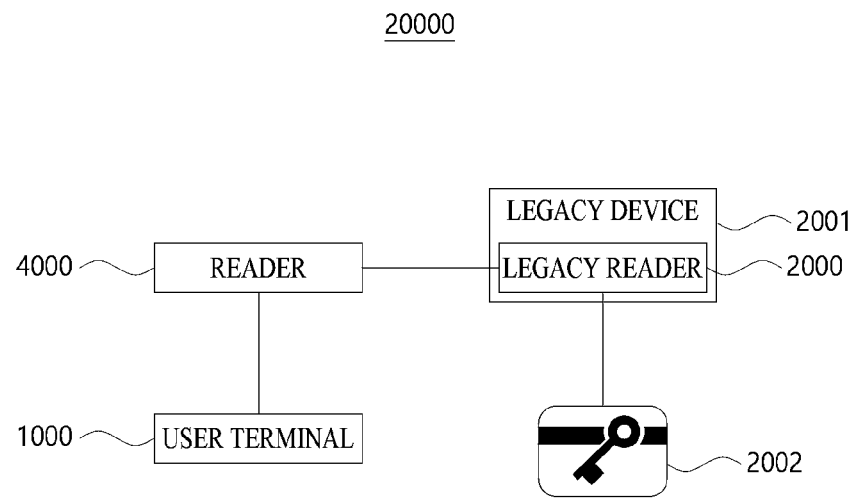
FIG. 11 is an environmental diagram illustrating an access control system according to one embodiment.

FIG. 11 is an environmental diagram illustrating an access control system 20000 according to one embodiment.

Referring to FIG. 11, the access control system 20000 according to one embodiment of the present invention may include a legacy device 2001, a reader 4000, a user terminal 1000, and a legacy key 2002.

The legacy device 2001 may control opening or closing of a door (not shown).

For example, the legacy device 2001 may be installed on the door to control locking or unlocking of the door. The legacy device 2001 may not necessarily be installed on the door and may optionally be provided in various forms. For example, the legacy device 2001 may be installed on a wall adjacent to the door and may provide an obstacle to the door or remove the obstacle therefrom. In addition, when the door is an automatic door, the legacy device 2001 may open or close the door by changing a position of a door leaf.

The legacy device 2001 may include a legacy reader 2000 to obtain information, which is necessary to determine whether to open the door, from the legacy key 2002.

The legacy device 2001 may be connected to the reader 4000.

According to one embodiment, the connection between the legacy device 2001 and the reader 4000 may be implemented by connecting the legacy reader 2000 and the reader 4000.

The reader 4000 may be configured to add a communication scheme, other than a communication scheme supported by the legacy reader 2000 which is pre-installed and is provided to the legacy device 2001.

The reader 4000 may be connected to the legacy device 2001.

According to one embodiment, the reader 4000 may be connected to the legacy reader 2000 included in the legacy device 2001.

The reader 4000 may be connected to the legacy reader 2000 to transmit and/or receive data therebetween.

According to one embodiment, the reader 4000 may acquire power required for operation using energy harvesting.

According to one embodiment, the reader 4000 may acquire power required for operation using high frequency wireless power harvesting. The high frequency wireless power harvesting may refer to collecting power from a wireless signal necessary for high frequency communication used in communications. For example, the reader 4000 may acquire the power required for operation using a RF signal transmitted from the legacy reader 2000.

According to one embodiment, the sub-reader may acquire power required for operation from external light. For example, the reader 4000 may include a light conversion module (not shown) that converts external light into an electric signal, and may acquire an electric signal obtained through the light conversion module as the power required for operation.

In addition, according to one embodiment, the reader 4000 may include a battery that pre-stores the power required for operation. The reader 4000 may store the power obtained by energy harvesting in the battery.

Moreover, according to one embodiment, the reader 4000 may not be provided with a battery and may be operated using power acquired by energy harvesting.

The user terminal 1000 may be an electronic device connected to the reader 4000.

According to one embodiment, the user terminal 1000 may be connected to the reader 4000 to transmit first request information to the reader 4000.

The first request information may be information provided by a user and/or a user terminal to the reader 4000 in order to request the reader 4000 to open the door.

According to one embodiment, the first request information may include detailed information including at least one of user identification information, terminal identification information, authentication information, and door security information.

The authentication information may be information used to determine whether the user and/or the user terminal are valid. For example, the authentication information may be an authentication token, biometric information, a password, or the like.

The authentication token may include at least one of authority information indicating an authority granted to the user and/or the terminal, validity conditions, issuer information, and receiver information.

In addition, according to one embodiment, the user terminal 1000 may request user authentication to a server device 3000 and obtain a user authentication result.

In the present invention, the user authentication may include at least one of authentication of the user to determine whether the user is a valid user and authentication of the terminal used by the user.

The user terminal 1000 may be, for example, an electronic device such as a smartphone, a tablet computer, a personal digital assistant (PDA), a notebook computer, or a wearable device.

Also, the user terminal 1000 may provide a communication method different from that of the legacy key 2002 described below. The communication method of the user terminal 1000 and the communication method of the legacy key 2002 are not necessarily different from each other, and the user terminal 1000 may support the communication method of the legacy key 2002 and may be implemented to further support another communication method that is not provided by the legacy key 2002.

The legacy key 2002 may be connected to the legacy device 2001.

According to one embodiment, the legacy key 2002 may be connected to the legacy reader 2000 provided to the legacy device 2001.

The legacy key 2002 may be, for example, a smart card, an integrated circuit (IC) card, a magnetic stripe card, or an RF card.

The legacy key 2002 may pre-store at least one piece of data for requesting the legacy device 2001 to open the door and data necessary for opening the door.

For example, data necessary for opening the door may be recorded in the legacy key 2002 in a magnetic manner.

The legacy key 2002 according to one embodiment may store door security information necessary for opening the door.

The door security information may include at least one of door key identification information, door identification information, a door password, open command information, and authentication information.

A door key identification number may be an identification number previously assigned to the door key and/or an identification number pre-stored in the door key.

The door identification information may be identification information for the door and/or the legacy device 2001.

The open command information may be data about a door open command for the legacy device 2001.

The legacy key 2002 may be connected to the legacy device 2001 to provide the door security information. Here, the connection between the legacy key 2002 and the legacy device 2001 may indicate that the legacy device 2001 acquires data from the legacy key 2002 directly or indirectly. For example, in a case where the legacy key 2002 is provided as a magnetic stripe card, when the legacy key 2002 is connected to the legacy device 2001 and provides the door security information, the legacy device 2001 may obtain the door security information recorded in a magnetic stripe.

Figure 12:
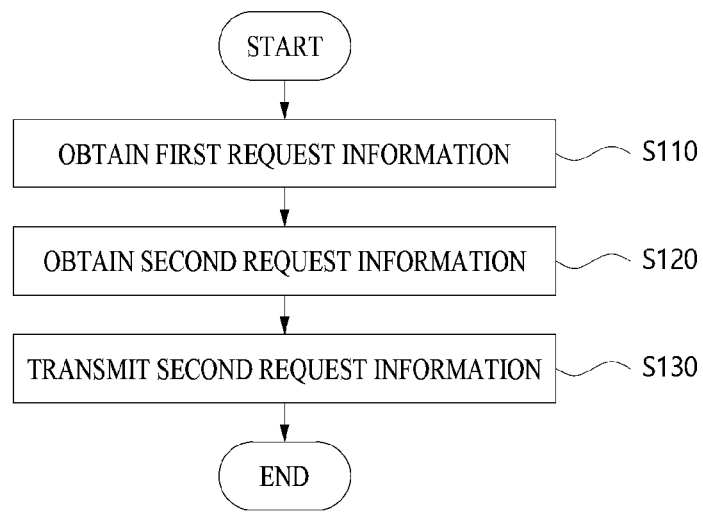
FIG. 12 is a flowchart illustrating an operation method of the reader 4000 according to one embodiment.

FIG. 12 is a flowchart illustrating an operation method of the reader 4000 according to one embodiment.

Referring to FIG. 12, the operation method of the reader 4000 includes obtaining first request information (S110), obtaining second request information (S120), and transmitting the second request information (S130).

According to one embodiment, the first request information may be obtained (S110).

According to one embodiment, the reader 4000 may obtain the first request information from the user terminal 1000.

The reader 4000 may obtain the first request information from the user terminal 1000 through the first reader communication unit 4011.

The reader 4000 may obtain the first request information in a first data format for a first communication method from the user terminal 1000 through the first reader communication unit 4011.

For example, when the first communication method is a Bluetooth communication method, the reader 4000 may obtain the first request information in a Bluetooth communication data format.

According to one embodiment, the reader 4000 may obtain the first request information from at least one of content output from the terminal display unit 3200 and content provided by a device or a medium other than the user terminal 1000.

The user terminal 1000 may output a barcode in which the first request information is recorded through the terminal display unit 3200. For example, the user terminal 1000 may output an image of a QR code in which the first request information is recorded through the terminal display unit 3200.

According to one embodiment, the reader sensor unit 4030 may acquire QR code data from the image of the QR code output through a display unit of the terminal, and the reader controller 4050 may obtain the QR code data from the reader sensor unit 4030 and acquire the first request information on the basis of the QR code data.

Alternatively, according to one embodiment, the reader sensor unit 4030 may obtain an image of the QR code output through the terminal display unit 3200 and provide the obtained image of the QR code to the reader controller 4050. The reader controller 4050 may acquire the QR code data from the obtained image of the QR code and acquire the first request information on the basis of the QR code data.

According to one embodiment, the reader controller 4050 may acquire the QR code data from an image of the QR code printed on paper and acquire the first request information on the basis of the acquired QR code data.

According to one embodiment, the reader 4000 may acquire the first request information on the basis of biometric information obtained from the user.

The reader sensor unit 4030 may obtain biometric information of the user who requests opening of the door. The reader sensor unit 4030 may provide the obtained biometric information to the reader controller 4050 and may obtain the biometric information as the first request information.

According to one embodiment, the second request information may be obtained (S120).

According to one embodiment, the reader 4000 may acquire the second request information on the basis of the first request information.

On the basis of the first request information, the reader 4000 may acquire the second request information in a data format different from a data format of the first request information.

The second request information may be information that the reader 4000 provides to the legacy device 2001 to request opening of the door.

According to one embodiment, the reader 4000 may obtain the first request information in a first data format for a first communication method from the user terminal 1000 through the first reader communication unit 4011.

The reader 4000 may obtain the second request information in a second data format for a second communication method on the basis of the first request information acquired in the first data format for the first communication method.

For example, the reader 4000 may acquire the second request information in a magnetic data format for a magnetic communication method on the basis of the first request information acquired in a Bluetooth communication data format for a Bluetooth communication method.

According to one embodiment, the first request information and the second request information may have different data formats but include the same detailed information.

For example, when the first request information contains door security information generated in a Bluetooth communication data format, the reader 4000 may acquire the second request information in a magnetic communication data format containing the door security information.

According to one embodiment, the reader 4000 may perform user authentication on the basis of the detailed information included in the first request information and acquire the second request information when the user authentication result indicates that the user is a valid user.

The reader 4000 may perform user authentication on the basis of the first request information.

According to one embodiment, when reference authentication information corresponding to the authentication information included in the acquired first request information has been pre-stored in the reader storage unit 4040, the reader 4000 may determine that the user is a valid user.

The reference authentication information may be authentication information that is pre-registered and stored for a valid user. For example, the reference authentication information may be biometric information of a valid user.

According to one embodiment, when an authentication token included in the first request information holds authority for opening the door corresponding to the reader 4000, and/or the legacy device 2001, the reader 4000 may determine that the user is a valid user.

The reader 4000 may acquire the second request information when the user authentication result indicates that the user is a valid user.

When the user authentication result indicates that the user is a valid user, the reader 4000 may acquire the second request information in the second data format so that the second request information may include detailed information which indicates that the user is a valid user. The detailed information indicating that the user is a valid user may not be limited to information that indicates that the user is determined to be a valid user by the user authentication, and may be replaced with information that requests opening of the door.

According to one embodiment, the reader 4000 may acquire the second request information on the basis of door security information, which is pre-stored on the basis of the first request information.

When the first request information only contains data necessary for user authentication, the reader 4000 may perform user authentication on the basis of the first request information and acquire the second request information on the basis of door security information pre-stored in the reader 4000 when the user authentication result indicates that the user is a valid user.

For example, when the first request information obtained by the reader 4000 is biometric information, the reader 4000 may perform user authentication on the basis of the biometric information and obtain the door security information pre-stored in the sub-reader storage unit as the second request information when the user authentication result indicates that the user is a valid user.

When the pre-stored door security information is formed in a data format different from the second data format, the reader 4000 may acquire the second request information by converting the security door information into the second data format.

According to one embodiment, the second request information may be transmitted (S130).

The reader 4000 may transmit the second request information.

The reader 4000 may provide the second request information to the legacy reader 2000 through the second reader communication unit 4013.

According to one embodiment, a communication method by which the second reader communication unit 4013 transmits the second request information to the legacy reader 2000 may be the same communication method as that used by the legacy reader 2000 to obtain the door security information through the legacy key 2002.

For example, the reader 4000 may provide the second request information to the legacy reader 2000 through a magnetic secure transmission method. Accordingly, when the legacy reader 2000 is a magnetic reader, the legacy reader 2000 may obtain the second request information from the second reader communication unit 4013 using a magnetic communication method.

The legacy reader 2000 may provide the obtained second request information to the legacy control unit 2070 and the legacy control unit 2070 may determine whether to open or close the door when the door security information is obtained from the legacy key 2002, and may control the door to be opened or closed on the basis of the determined result.

Hereinafter, an access control system 20000' according to another embodiment of the present invention will be described with reference to FIGS. 13 and 14. The access control system 20000' according to another embodiment of the present invention may be implemented by adding a server device 3000 to the access control system 20000 according to one embodiment of the present invention. Thus, in describing the access control system 20000' according to another embodiment of the present invention, the same numerals represent the same or substantially the same elements as those of the access control system 20000 according to one embodiment of the present invention and detailed descriptions of the same elements will be omitted.

Figure 13:
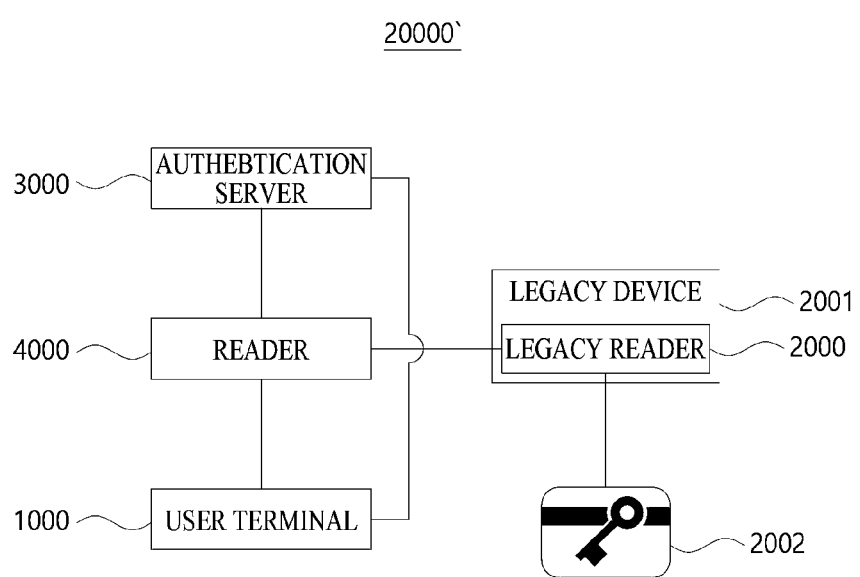
FIG. 13 is an environmental diagram illustrating an access control system according to another embodiment.

FIG. 13 is an environmental diagram illustrating an access control system according to another embodiment.

Referring to FIG. 13, the access control system 20000' according to another embodiment may include a legacy device 2001, a reader 4000, a user terminal 1000, and a server device 3000.

The legacy device 2001 may control opening or closing of a door.

For example, the legacy device 2001 may be installed on the door to control locking or unlocking of the door. The legacy device 2001 may not necessarily be installed on the door and may optionally be provided in various forms. For example, the legacy device 2001 may be installed on a wall adjacent to the door and may provide an obstacle to the door or remove the obstacle therefrom. In addition, when the door is an automatic door, the legacy device 2001 may open or close the door by changing a position of a door leaf.

The legacy device 2001 may include a legacy reader 2000 to acquire information, which is necessary to determine whether to open the door, from the legacy key 2002.

The legacy device 2001 may be connected to the reader 4000.

The reader 4000 may be connected to the legacy device 2001.

The reader 4000 according to another embodiment may be connected to a legacy reader 2000 included in the legacy device 2001.

The reader 4000 may be connected to the legacy reader 2000 to transmit and/or receive data therebetween.

In addition, the reader 4000 may be connected to the user terminal 1000 to transmit and/or receive data therebetween.

Additionally, the reader 4000 may be connected to the authentication server 3000 to transmit and/or receive data therebetween.

The user terminal 1000 may be an electronic device connected to the reader 4000.

The user terminal 1000 may be connected to the reader 4000 and may transmit first request information to the reader 4000.

The user terminal 1000 may be, for example, a smartphone, a tablet computer, a PDA, a notebook computer, or a wearable device.

In addition, the user terminal 1000 may provide a communication method different from that of the legacy key 2002 described below.

Also, the user terminal 1000 may be connected to the authentication server 3000 to transmit and/or receive data therebetween.

The authentication server 3000 may be connected to an external electronic device.

According to another embodiment, the authentication server 3000 may be connected to at least one of the reader 4000 and the user terminal 1000.

The authentication server 3000 may perform authentication in response to a request from at least one of the reader 4000 and the user terminal 1000.

According to another embodiment, the authentication server 3000 may perform authentication of a user of the user terminal 1000. Alternatively, the authentication server 3000 may perform authentication of the user terminal 1000 itself.

Figure 14:
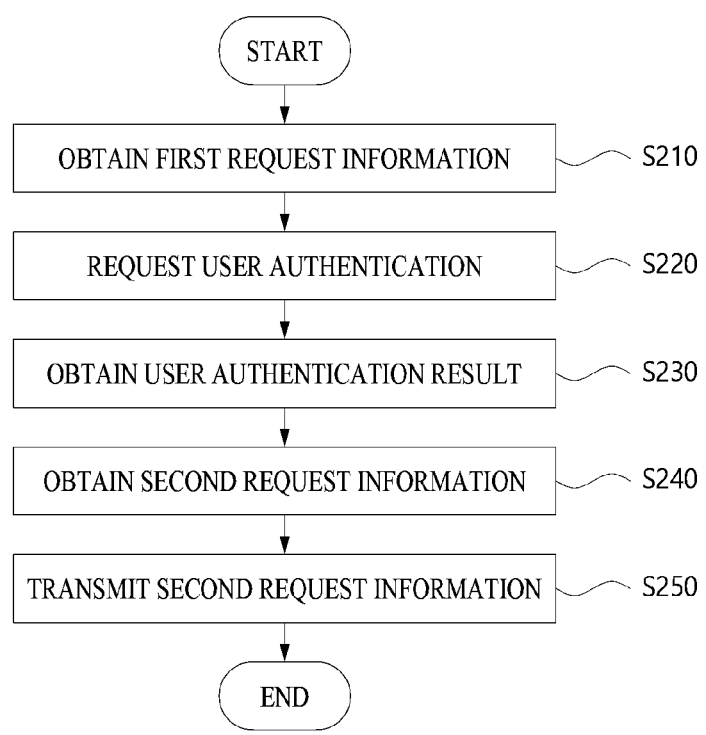
FIG. 14 is a flowchart illustrating an operation method of a reader according to another embodiment.

FIG. 14 is a flowchart illustrating an operation method of a reader according to another embodiment of the present invention.

Referring to FIG. 14, the operation method of the reader 4000 may include obtaining first request information (S210), requesting user authentication (S220), obtaining a user authentication result (S230), obtaining second request information (S240), and transmitting the second request information (S250).

According to another embodiment, the first request information may be obtained (S210).

The reader 4000 may acquire the first request information from the user terminal 1000.

The reader 4000 may obtain the first request information from the user terminal 1000 through the first reader communication unit 4011.

The first request information may be data that the user terminal 1000 provides to the reader 4000 to request opening of the door.

The first request information according to another embodiment may include at least one of an authentication token, user authentication information, and door security information stored in the door key 2002.

The reader 4000 may obtain the first request information in a first data format for a first communication method from the user terminal 1000 through the first reader communication unit 4011.

For example, the reader 4000 may acquire the first request information in a Bluetooth communication data format.

According to another embodiment, the reader 4000 may obtain the first request information from at least one of content output from the terminal display unit 3200 and content provided by a device or a medium other than the user terminal 1000.

According to another embodiment, the reader sensor unit 4030 may acquire QR code data from an image of a QR code output through the terminal display unit 3200, and the reader control unit 4050 may obtain the QR code data from the reader sensor unit 4030 and obtain the first request information on the basis of the QR code data.

Alternatively, according to another embodiment, the reader sensor unit 4030 may obtain an image of a QR code output through the terminal display unit 3200 and provide the obtained image of the QR code to the reader control unit 4050. The reader control unit 4050 may acquire the QR code data from the obtained image of the QR code and acquire the first request information on the basis of the QR code data.

According to another embodiment, the reader control unit 4050 may acquire the QR code data from an image of the QR code printed on paper and acquire the first request information on the basis of the acquired QR code data.

According to another embodiment, the reader 4000 may acquire the first request information on the basis of biometric information obtained from the user.

The reader sensor unit 4030 may obtain biometric information of the user who requests opening of the door. The reader sensor unit 4030 may provide the obtained biometric information to the reader control unit 4050 and may obtain the biometric information as the first request information.

According to another embodiment, user authentication may be requested (S220).

The reader 4000 may transmit the obtained first request information to the authentication server 3000.

The reader 4000 may request the authentication server 3000 to perform user authentication on the basis of the first request information.

The authentication server 3000 may obtain the first request information from the reader 4000.

The authentication server 3000 may perform user authentication on the basis of the first request information.

The first request information according to another embodiment may include detailed information including at least one of user identification information, terminal identification information, authentication token, user authentication information, and door security information.

According to another embodiment, the authentication server 3000 may determine that the user is a valid user when the detailed information included in the first request information has been pre-stored.

According to another embodiment, when the authentication token included in the first request information holds authority for opening the door corresponding to the reader 4000, and/or the legacy device 2001, the authentication server 3000 may determine that the user is a valid user.

According to another embodiment, a user authentication result is obtained (S230).

The reader 4000 may obtain a user authentication result from the authentication server 3000.

According to another embodiment, the reader 4000 may acquire second request information when the user authentication result indicates that the user is a valid user.

Alternatively, according to another embodiment, the reader 4000 may output a message through the reader display unit 4020 to indicate that the authentication has failed when the obtained user authentication result indicates that the user is not valid.

According to another embodiment, the second request information may be obtained (S240).

The reader 4000 may obtain the second request information on the basis of at least one of the first request information and the user authentication result obtained from the authentication server 3000.

According to another embodiment, the operation of obtaining the second request information on the basis of the first request information may be an operation of acquiring the second request information in a data format different from a format of the first request information, on the basis of the first request information.

As described above, the reader 4000 may obtain the first request information in the first data format for the first communication method from the user terminal 1000 through the first reader communication unit 4011.

The reader 4000 may obtain the second request information in the second data format for the second communication method on the basis of the first request information acquired in the first data format for the first communication method.

For example, the reader 4000 may acquire the second request information in a magnetic data format for a magnetic communication method on the basis of the first request information acquired in a Bluetooth communication data format for a Bluetooth communication method.

In addition, according to another embodiment, the first request information and the second request information may have different data formats but include the same detailed information.

According to another embodiment, when the authentication result indicates that the user is a valid user, the reader 4000 may obtain pre-stored door security information as the second request information.

When the pre-stored door security information is formed in a data format different from the second data format, the reader 4000 may acquire the second request information by converting the security door information into the second data format.

According to another embodiment, the second request information may be transmitted (S250).

The reader 4000 may transmit the second request information.

The reader 4000 may provide the second request information to the legacy reader 2000 through the second reader communication unit 4013.

According to another embodiment, a communication method by which the second reader communication unit 4013 transmits the second request information to the legacy reader 2000 may be the same communication method as that used by the legacy reader 2000 to obtain the door security information through the door key 2002.

For example, the reader 4000 may transmit the second request information to the legacy reader 2000 using a magnetic communication method.

When the legacy device 2001 obtains the second request information from the reader 4000 through the legacy reader 2000, the legacy device 2001 may determine whether to open or close the door when the door security information is obtained from the door key 2002, and may open or close the door on the basis of the determined result.

Although in the above description, the reader 4000 is described as requesting the user authentication to the authentication server 3000 on the basis of the first request information, the present invention is not limited thereto and a modification in which the user terminal 1000 requests the authentication server 3000 for user authentication and then provides the first request information to the reader 4000 may be possible.

Figure 15:
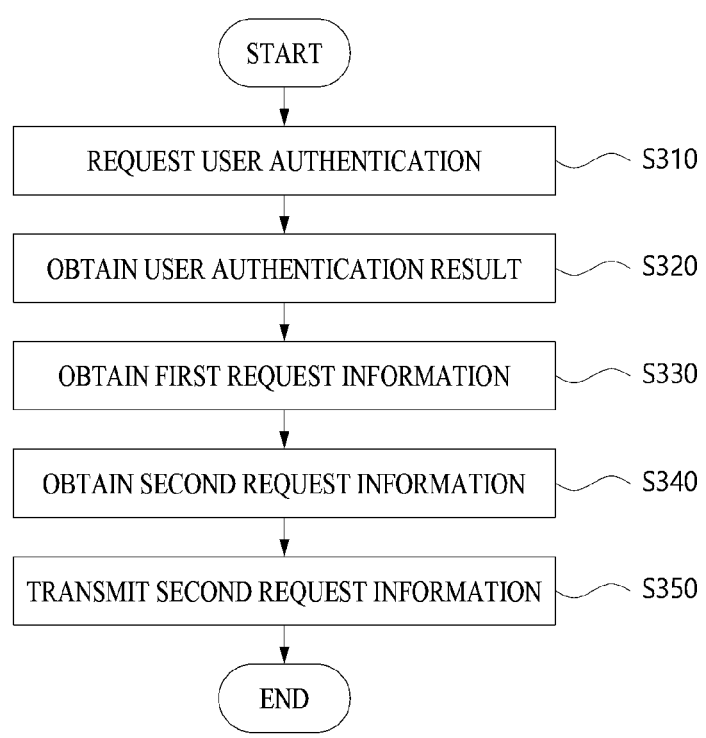
FIG. 15 is a flowchart illustrating an operation method of the reader according to another embodiment.

FIG. 15 is a flowchart illustrating an operation method of the reader according to another embodiment.

Referring to FIG. 15, the operation method according to another embodiment may include requesting, by the user terminal 1000, user authentication (S310), obtaining, by the user terminal 1000, a user authentication result (S320), obtaining, by the reader 4000, first request information (S330), obtaining, by the reader 4000, second request information (S340), and transmitting, by the reader 4000, the second request information (S350).

According to another embodiment, the user terminal 1000 may request user authentication (S310).

The user terminal 1000 may request user authentication by transmitting user authentication information to the authentication server 3000.

The user authentication information may include at least one of user identification information, terminal identification information, and a password.

In addition, the user terminal 1000 may request user authentication by transmitting access target identification information about an access target to enter and exit.

The access target identification information may be at least one of identification information of a door, identification information of the legacy device 2001 corresponding to the door, and identification information of the reader 4000 corresponding to the door.

In addition, the user terminal 1000 may request user authentication by further transmitting sub-authentication information obtained from the reader 4000 at the time of requesting authentication.

According to another embodiment, the reader 4000 may transmit pre-stored sub-authentication information to the user terminal 1000. The sub-authentication information may include at least one of identification information assigned to the reader 4000 and an encryption key pre-stored in the reader 4000.

The authentication server 3000 may obtain at least one of the user authentication information and the access target identification information.

The authentication server 3000 may perform user authentication on the basis of the user authentication information.

According to another embodiment, the authentication server 3000 may determine that the user is a valid user when the user identification information obtained from the user terminal 1000 has been pre-stored in the authentication server 3000.

According to another embodiment, the user may be determined to be a valid user when a password included in the user authentication information is the same as a stored password matched with the user identification information which is pre-stored in the authentication server 3000.

According to another embodiment, the authentication server 3000 may determine that the user is a valid user when the user identification information and the access target identification information, which are included in the obtained user authentication information, are pre-stored in the authentication server 3000 and the obtained user identification information is identification information of a user who has access to open the door corresponding to the access target identification information and/or the legacy device 2001 corresponding to the door.

According to another embodiment, the authentication server 3000 may perform user authentication by further considering the sub-authentication information obtained from the user terminal 1000. For example, the authentication server 3000 may determine that the user is a valid user when the identification information of the sub-reader and the encryption key, which are included in the sub-authentication information, match the identification information of the sub-reader and the encryption key which are pre-stored in the authentication server 3000.

According to another embodiment, the user terminal 1000 may obtain a user authentication result (S320).

The user terminal 1000 may obtain the user authentication result from the authentication server 3000.

According to another embodiment, when the user authentication result indicates that the user is a valid user, the user terminal 1000 may obtain access permission information indicating that the user is determined to be a valid user.

According to another embodiment, when the user authentication result indicates that the user is a valid user, the user terminal 1000 may obtain door security information corresponding to the user authentication information.

According to another embodiment, the reader 4000 may obtain the first request information (S330).

The reader 4000 may obtain the first request information from the user terminal 1000.

The reader 4000 may obtain the first request information from the user terminal 1000 using a first communication method.

The reader 4000 may obtain the first request information from the user terminal 1000 through the first reader communication unit 4011.

According to another embodiment, the reader 4000 may obtain the secure door information that the user terminal 1000 may obtain based on the user authentication result, as the first request information.

According to another embodiment, the reader 4000 may obtain access permission information indicating that the user is determined to be a valid user as the first request information.

According to another embodiment, the reader 4000 may obtain the first request information from at least one of content output from the terminal display unit 3200 and content provided by a device or a medium other than the user terminal 1000.

According to another embodiment, the reader sensor unit 4030 may acquire QR code data from an image of a QR code output through the terminal display unit 3200, and the reader controller 4050 may obtain the QR code data from the reader sensor unit 4030 and obtain the first request information on the basis of the QR code data.

Alternatively, according to another embodiment, the reader sensor unit 4030 may obtain an image of a QR code output through the terminal display unit 3200 and provide the obtained image of the QR code to the reader controller 4050. The reader controller 4050 may acquire the QR code data from the obtained image of the QR code and obtain the first request information on the basis of the QR code data.

According to another embodiment, the reader controller 4050 may acquire the QR code data from an image of the QR code printed on paper and acquire the first request information on the basis of the acquired QR code data.

According to another embodiment, the reader 4000 may acquire the first request information on the basis of biometric information obtained from the user.

The reader sensor unit 4030 may obtain biometric information of the user who requests opening of the door. The reader sensor unit 4030 may provide the obtained biometric information to the reader controller 4050 and may obtain the biometric information as the first request information.

According to another embodiment, the reader 4000 may obtain the second request information (S340).

The reader 4000 may obtain the second request information in a second data format for a second communication method on the basis of the first request information acquired in the first data format for the first communication method.

According to another embodiment, the first request information and the second request information may have different data formats but include the same detailed information.

According to another embodiment, the reader 4000 may transmit the second request information (S350).

The reader 4000 may transmit the second request information.

The reader 4000 may provide the second request information to the legacy reader 2000 through the second reader communication unit 4013.

According to another embodiment, a communication method by which the second reader communication unit 4013 transmits the second request information to the legacy reader 2000 may be the same communication method as that used by the legacy reader 2000 to obtain the door security information through the legacy key 2002.

When the legacy device 2001 obtains the second request information from the reader 4000 through the legacy reader 2000, the legacy device 2001 may determine whether to open or close the door when the door security information is obtained from the legacy key 2002, and may open or close the door on the basis of the determined result.

Advantageous effects of the disclosure are not limited to the aforementioned effects, and other advantageous effects that are not described herein will be clearly understood by those skilled in the art from the following description and the accompanying drawings.

While the elements and features of the present disclosure have been described with reference to embodiments of the present invention, the present disclosure is not limited thereto. It will be obvious to those skilled in the art that various changes or modifications may be made therein without departing from the spirit and scope of the present disclosure. Accordingly, such changes or modifications are intended to fall within the scope of the appended claims.

Although the present disclosure has been described with reference to specific embodiments and drawings, it will be appreciated that various modifications and changes can be made from the disclosure by those skilled in the art. For example, appropriate results may be achieved although the described techniques are performed in an order different from that described above and/or although the described components such as a system, a structure, a device, or a circuit are combined in a manner different from that described above and/or replaced or supplemented by other components or their equivalents.

Therefore, other implementations, embodiments, and equivalents are within the scope of the following claims.

What is claimed is:

1. A method for controlling a reader communicating with a user terminal using Bluetooth Low Energy (BLE), comprising:
    transmitting a first advertising packet to the user terminal as a peripheral device role in a Generic Access Profile (GAP) in a BLE protocol stack;
    performing a first authentication with the user terminal that has received the first advertising packet as the peripheral device role in the GAP;
    discovering service of the user terminal that has received the first advertising packet by the reader that has transmitted the first advertising packet after the first authentication is performed as a client role in a Generic Attribute Profile (GATT) in the BLE protocol stack;
    obtaining a first service data from the user terminal that has received the first advertising packet in response to the discovering service as the client role in the GATT;
    discovering characteristic of the user terminal by the reader that has transmitted the first advertising packet based on the first service data as the client role in the GATT; and
    obtaining a first characteristic data from the user terminal that has received the first advertising packet in response to the discovering characteristic as the client role in the GATT;
    wherein the user terminal performs a central device role in the GAP, and
    wherein the user terminal performs a server role in the GATT.

2. The method of claim 1, wherein the reader is connected to a legacy reader provided in a predetermined device and provides a first communication protocol including the BLE not supported by the legacy reader, wherein the reader obtains data from the user terminal in the first communication protocol, and
    the method further comprising:
    converting a format of data obtained from the user terminal into a format interpreted by the legacy reader; and
    transmitting the converted data to the legacy reader in a second communication protocol supported by the legacy reader.

3. The method of claim 1, wherein the reader is connected to a legacy reader provided in a predetermined device, wherein the reader communicates with the user terminal in a first communication protocol including the BLE not supported by the legacy reader and communicates with the legacy reader or the predetermined device in a second communication protocol supported by the legacy reader, wherein the reader obtains data from the user terminal in the first communication protocol, and the method further comprising:
performing an authentication of the user terminal for the legacy reader based on data obtained from the user terminal; and
providing the data to the legacy reader in the second communication protocol based on a result of the authentication, when the user terminal has an authority to provide information to the legacy reader.

4. The method of claim 1, the method further comprising:
obtaining a scan request packet from the user terminal after transmitting the first advertising packet; and
transmitting a scan response packet to the user terminal in response to the scan request packet.

5. The method of claim 1, the method further comprising:
storing a handle value of the user terminal.

6. The method of claim 1, the method further comprising:
storing an Universally Unique Identifier (UUID) of the user terminal.

7. The method of claim 5, when a second communication between the reader and the user terminal is performed, after a first communication between the reader and the user terminal including the storing the handle value is terminated, the method further comprising:
transmitting a second advertising packet to the user terminal;
performing a second authentication with the user terminal, which has received the second advertising packet;
transmitting, by the reader that has transmitted the second advertising packet, an enable write command to the user terminal after the second authentication is performed,
wherein the reader does not discover service of the user terminal in the second communication.

8. The method of claim 7, the method further comprising:
obtaining, by the reader that has transmitted the second advertising packet, a second characteristic data from the user terminal based on the stored handle value after the second authentication is performed,
wherein the reader does not discover characteristic of the user terminal in the second communication.

9. The method of claim 1, the method further comprising:
obtaining information on a shared key and a first one-time password (OTP) generated at a first time from the user terminal;
generating a second OTP at a second time based on the shared key, wherein the first time and second time are included within a predetermined time interval; and
comparing the first OTP and the second OTP.

10. A non-transitory computer-readable recording medium having recorded thereon a program for performing the method of claim 1.

11. A method for controlling a user terminal communicating with a reader using Bluetooth Low Energy (BLE), comprising:
obtaining a first advertising packet from the reader as a central device role in a Generic Access Profile (GAP) in a BLE protocol stack;
performing a first authentication with the reader that has transmitted the first advertising packet as the central device role in the GAP;
obtaining, by the user terminal that has obtained the first advertising packet, discovering service from the reader that has transmitted the first advertising packet after the first authentication is performed as a server role in a Generic Attribute Profile (GATT) in the BLE protocol stack;
transmitting a first service data to the reader that has transmitted the first advertising packet in response to the discovering service as the server role in the GATT;
obtaining discovering characteristic from the reader that has transmitted the first advertising packet based on the first service data as the server role in the GATT; and
transmitting a first characteristic data to the reader that has transmitted the first advertising packet in response to the discovering characteristic as the server role in the GATT;
wherein the reader performs a peripheral device role in the GAP, and
wherein the reader performs a client role in the GATT.

12. A non-transitory computer-readable recording medium having recorded thereon a program for performing the method of claim 11.

13. A method for controlling a first device communicating with a second device using Bluetooth Low Energy (BLE), comprising:
transmitting a first advertising packet to the second device as a peripheral device role in a Generic Access Profile (GAP) in a BLE protocol stack;
performing a first authentication with the second device that has received the first advertising packet as the peripheral device role in the GAP;
discovering service of the second device that has received the first advertising packet by the first device that has transmitted the first advertising packet after the first authentication is performed as a client role in a Generic Attribute Profile (GATT) in the BLE protocol stack;
obtaining a first service data from the second device that has received the first advertising packet in response to the discovering service as the client role in the GATT;
discovering characteristic of the second device that has received the first advertising packet based on the first service data as the client role in the GATT; and
obtaining a first characteristic data from the second device that has received the first advertising packet in response to the discovering characteristic as the client role in the GATT;
wherein the second device performs a central device role in the GAP, and
wherein the second device performs a server role in the GATT.

14. A non-transitory computer-readable recording medium having recorded thereon a program for performing the method of claim 13.

15. A reader for communicating with a user terminal using Bluetooth Low Energy (BLE), comprising:
a communication unit; and
a processor, wherein the processor configured to:
transmit a first advertising packet to the user terminal as a peripheral device role in a Generic Access Profile (GAP) in a BLE protocol stack;
perform a first authentication with the user terminal that has received the first advertising packet as the peripheral device role in the GAP;

discover a service of the user terminal that has received the first advertising packet by the reader that has transmitted the first advertising packet after the first authentication is performed as a client role in a Generic Attribute Profile (GATT) in the BLE protocol stack;

obtain a first service data from the user terminal that has received the first advertising packet in response to the discovering service as the client role in the GATT;

discover characteristic of the user terminal that has received the first advertising packet based on the first service data as the client role in the GATT; and obtain a first characteristic data from the user terminal that has received the first advertising packet in response to the discovering characteristic as the client role in the GATT;

wherein the user terminal performs a central device role in the GAP, and wherein the user terminal performs a server role in the GATT.

\* \* \* \* \*